(12) United States Patent
Dwivedi et al.

(10) Patent No.: US 12,341,676 B2
(45) Date of Patent: Jun. 24, 2025

(54) NETWORK MONITORING AND MANAGEMENT PROFILE GENERATION INTERFACE, APPARATUS AND METHOD

(71) Applicant: RAKUTEN SYMPHONY, INC., Tokyo (JP)

(72) Inventors: Abhinav Dwivedi, Indore (IN); Abhishek Gadekar, Indore (IN); Bakir Malak, Indore (IN); Azhar Shaikh, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/253,208

(22) PCT Filed: Jan. 26, 2023

(86) PCT No.: PCT/US2023/011574
§ 371 (c)(1),
(2) Date: May 17, 2023

(87) PCT Pub. No.: WO2024/158393
PCT Pub. Date: Aug. 2, 2024

(65) Prior Publication Data
US 2024/0396818 A1 Nov. 28, 2024

(51) Int. Cl.
*H04L 43/0876* (2022.01)
(52) U.S. Cl.
CPC ............................ *H04L 43/0876* (2013.01)

(58) Field of Classification Search
CPC ........ H04L 43/16; H04L 43/045; H04L 43/04; H04L 43/08; H04L 43/55; H04L 43/00; H04L 43/02; H04L 43/06; H04L 43/10
See application file for complete search history.

(56) References Cited

U.S. PATENT DOCUMENTS

| | | | | |
|---|---|---|---|---|
| 8,132,260 | B1* | 3/2012 | Mayer | H04L 63/1433 726/25 |
| 10,289,107 | B2* | 5/2019 | Warner | G05B 23/0208 |
| 10,360,127 | B1* | 7/2019 | McSweeney | G06F 3/0653 |
| 11,044,179 | B1* | 6/2021 | Bettaiah | G06F 11/3452 |
| 11,366,842 | B1* | 6/2022 | Swaminathan | G06F 16/2477 |
| 11,729,070 | B2* | 8/2023 | Kadidal | H04L 41/22 709/224 |
| 12,120,005 | B1* | 10/2024 | Bettaiah | G06F 11/328 |

(Continued)

*Primary Examiner* — David R Lazaro
(74) *Attorney, Agent, or Firm* — HAUPTMAN HAM, LLP

(57) ABSTRACT

A graphical user interface is caused to be output by a display by an apparatus including a processor and a memory. The graphical user interface includes a first user input field configured to receive a first user input identifying a target key performance indicator (KPI) parameter associated with a network, a second user input field configured to receive a second user input identifying a KPI historical data parameter, a third user input field configured to receive a third user input identifying a baseline threshold parameter, and a fourth user input field configured to receive a fourth user input identifying a quantity of historical KPI values to be included in a first set of one or more historical KPI values. The target KPI parameter, the KPI historical data parameter, the quantity of historical KPI values, and the baseline threshold parameter are processed to generate a KPI management profile.

20 Claims, 18 Drawing Sheets

(56) References Cited

U.S. PATENT DOCUMENTS

| | | | |
|---|---|---|---|
| 2008/0082181 A1* | 4/2008 | Miller | G05B 23/0245 |
| | | | 700/30 |
| 2015/0046251 A1* | 2/2015 | Smith | G06F 16/41 |
| | | | 705/14.41 |
| 2020/0186411 A1* | 6/2020 | Ravichandran | H04L 41/0659 |
| 2020/0313985 A1* | 10/2020 | Jayakumar | H04L 41/14 |
| 2021/0203576 A1* | 7/2021 | Padfield | H04L 41/5009 |
| 2021/0287157 A1* | 9/2021 | Aditya | G06Q 10/06393 |
| 2023/0091638 A1* | 3/2023 | Medithe | H04W 72/54 |
| | | | 709/224 |
| 2023/0105248 A1* | 4/2023 | Kadidal | H04L 41/0681 |
| | | | 709/224 |
| 2024/0171493 A1* | 5/2024 | Trivedi | G06Q 10/0639 |
| 2024/0205106 A1* | 6/2024 | Trivedi | G06Q 10/06393 |
| 2024/0291707 A1* | 8/2024 | Dwivedi | H04L 41/5009 |
| 2024/0291732 A1* | 8/2024 | Gadekar | H04L 41/5009 |
| 2024/0396818 A1* | 11/2024 | Dwivedi | G06Q 50/50 |

\* cited by examiner

NETWORK MONITORING AND MANAGEMENT PROFILE GENERATION INTERFACE, APPARATUS AND METHOD

RELATED APPLICATIONS

The present application is a National Phase of International Application No. PCT/US2023/011574, filed Jan. 26, 2023.

TECHNICAL FIELD

The present disclosure is related to monitoring an operating status of a network by identifying deviation(s) in key performance indicators (KPIs) that are indicative of the operating state of the network.

BACKGROUND

Network service providers and device manufacturers (e.g., wireless, cellular, etc.) are continually challenged to deliver value and convenience to consumers by, for example, providing compelling network services that are dependable and capable of being flexibly constructed, scalable, diverse, and economically operated. To provide such network services, service providers and device manufacturers often track various KPIs.

SUMMARY

An aspect of this description is directed to an apparatus comprising a processor and a memory having instructions stored thereon that, when executed by the processor, cause the apparatus to cause a graphical user interface to be output by a display. The graphical user interface comprises a first user input field configured to receive a first user input identifying a target key performance indicator (KPI) parameter associated with a network. The graphical user interface also comprises a second user input field configured to receive a second user input identifying a KPI historical data parameter. The graphical user interface further comprises a third user input field configured to receive a third user input identifying a baseline threshold parameter. The graphical user interface additionally comprises a fourth user input field configured to receive a fourth user input identifying a quantity of historical KPI values to be included in a first set of one or more historical KPI values. The apparatus is also caused to process the target KPI parameter, the KPI historical data parameter, the quantity of historical KPI values, and the baseline threshold parameter to generate a KPI management profile. In response to validating the quantity of historical KPI values is available to be included in the first set of one or more historical KPI values, the apparatus is further caused to process the target KPI parameter and the first set of one or more historical KPI values based on the KPI historical data parameter to generate an initial baseline threshold value to which target KPI data is compared with respect to the KPI management profile to determine an operating state of the network.

Another aspect of this description is directed to a method comprising causing, by a processor, a graphical user interface to be output by a display. The graphical user interface comprises a first user input field configured to receive a first user input identifying a target key performance indicator (KPI) parameter associated with a network. The graphical user interface also comprises a second user input field configured to receive a second user input identifying a KPI historical data parameter. The graphical user interface further comprises a third user input field configured to receive a third user input identifying a baseline threshold parameter. The graphical user interface additionally comprises a fourth user input field configured to receive a fourth user input identifying a quantity of historical KPI values to be included in a first set of one or more historical KPI values. The method also comprises processing the target KPI parameter, the KPI historical data parameter, the quantity of historical KPI values, and the baseline threshold parameter to generate a KPI management profile. The method further comprises, in response to validating the quantity of historical KPI values is available to be included in the first set of one or more historical KPI values, processing the target KPI parameter and the first set of one or more historical KPI values based on the KPI historical data parameter to generate an initial baseline threshold value to which target KPI data is compared with respect to the KPI management profile to determine an operating state of the network.

Another aspect of this description is direct to a non-transitory computer readable medium having instructions stored that, when executed by a processor, cause an apparatus to cause a graphical user interface to be output by a display. The graphical user interface comprises a first user input field configured to receive a first user input identifying a target key performance indicator (KPI) parameter associated with a network. The graphical user interface also comprises a second user input field configured to receive a second user input identifying a KPI historical data parameter. The graphical user interface further comprises a third user input field configured to receive a third user input identifying a baseline threshold parameter. The graphical user interface additionally comprises a fourth user input field configured to receive a fourth user input identifying a quantity of historical KPI values to be included in a first set of one or more historical KPI values. The apparatus is also caused to process the target KPI parameter, the KPI historical data parameter, the quantity of historical KPI values, and the baseline threshold parameter to generate a KPI management profile. In response to validating the quantity of historical KPI values is available to be included in the first set of one or more historical KPI values, the apparatus is further caused to process the target KPI parameter and the first set of one or more historical KPI values based on the KPI historical data parameter to generate an initial baseline threshold value to which target KPI data is compared with respect to the KPI management profile to determine an operating state of the network.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
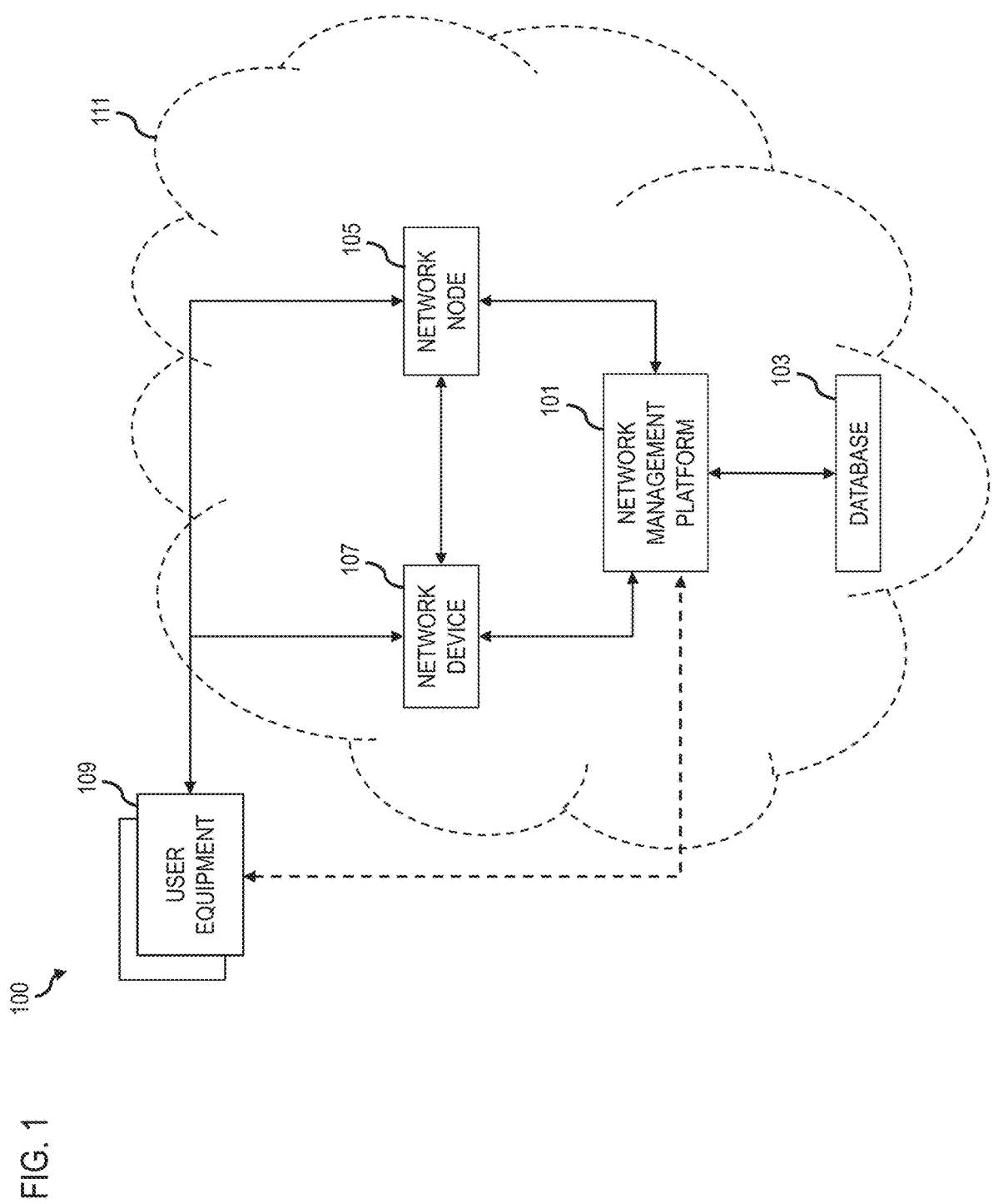
FIG. 1 is a diagram of a network monitoring system that facilitates network monitoring and/or generating one or more KPI management profiles, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Network services are often provided by static or inflexible systems that are difficult to configure, scale, and deploy over various target areas. Dependable network systems and/or network services that are capable of being flexibly constructed, scalable and diverse are often reliant on the collection, analysis and reporting of information regarding multiple network functions, network services, network devices, etc. that affect the performance, accessibility, configuration, scale, and/or deployment of a communication network, various network functions, network services, and the like.

Network service providers often deploy network monitoring systems that track a key performance indicator (KPI) of an aspect of network for determining how well that aspect and/or the network is performing.

For example, when the KPI value for a certain network feature is below a threshold, the KPI value may imply that the network is operating normally. On the other hand, when the KPI value is above or equal to the threshold, the KPI value implies that the network is operating below expectation, which in turn may indicate that some unexpected event (such as a hardware failure, capacity overload, a cyberattack, etc.) has occurred. Accordingly, a series of actions can be carried out by the monitoring system such as alerting the network operator, shifting a network function from a problematic server to a healthy server, temporarily shutting down the network, or some other suitable action.

Of course, depending on the network configuration and/or the KPI being tracked, a condition in which the KPI value is higher than or equal to a threshold can also indicate that the network is operating normally, while a condition in which the KPI value is below the threshold indicates that the network is operating below expectation.

Various types of threshold configurations are possible, since said threshold configurations may vary depending on the needs of specific user or specific network operator, depending on individual preference, and the like.

When monitoring network states, a single user may be required to monitor multiple KPIs at the same time, such as: KPIs of a similar aspect of a network for different locations, KPIs of different aspects of the network for one location, or a combination thereof. Sometimes, a user may want to configure the thresholds for one KPI differently for different locations (e.g., a threshold indicating capacity overload in Tokyo should be higher than a threshold indicating capacity overload in Hokkaido, and the like) and/or according to the specific aspect of the network system (e.g., a threshold indicating capacity overload should be higher than a threshold indicating hardware failure, a threshold of network availability on a weekend should be higher than a threshold of network availability on weekdays, and the like).

In addition, multiple users may be involved in monitoring KPIs of the network system. Some of the users may be required to monitor a same KPI, but each user may want to configure the threshold of the particular KPI in a different manner, since the definition of "normal" and "abnormal" may be different according to the user or the user's role with respect to monitoring the network. For example, if two users are required to monitor a KPI associated with network capacity, a first user of the two users may be responsible for determining whether or not there is a need to provide additional network capacity, while a second user of the two users may be responsible for determining whether or not the network is experiencing a cyberattack. In this case, a threshold value A for the KPI may indicate that the network capacity is almost full, but the same value A does not imply that the network is experiencing a cyberattack. In that case, value A may be suitable to be used as the threshold of the KPI associated with network capacity for the first user, but is not suitable to be used as the threshold of the same KPI for the second user.

Further, since the status of the network varies dynamically, thresholds being set or configured may be suitable for a specific time period but can be unsuitable for another time period. Thus, a user is often required to always monitor the status of the network system and to frequently adjust the thresholds in order to reduce the occurrence of false alarms. Doing so, however, is unduly burdensome for the user, particularly when the user needs to monitor multiple KPIs at the same time.

Accordingly, there is a need to provide a network monitoring system that allows a user to customize thresholds for multiple KPIs at one time. Further, there is also a need to provide a network monitoring system which allows the system to automatically adjust or configure the threshold of one or more KPIs based on the user's preference. Furthermore, there is a need to provide a network monitoring system which allow multiple users to set a threshold of a KPI in a manner that is different from other users.

Furthermore, conventional network monitoring systems that utilize threshold(s) and algorithm(s) (which define or are usable to identify an anomaly in a network) are often hard-coded by a network apparatus' manufacturer, by a network vendor, by a main network operator, or others (hereinafter referred to as "person(s) who hard-coded the thresholds"). Said threshold(s) and algorithm(s) are often not visible to the person(s) in charge of the network monitoring system (e.g., the main network operator, the virtual network operator, etc.), and even if such information is provided, the threshold(s) information is normally too general (e.g., simply showing a value indicating a network performance is below/above a threshold value) and/or the algorithm(s) are normally in a black-box form. Thus, such information does not provide any detailed explanation as to how the network monitoring system decides an anomaly occurs in a network and is not useful for the user.

Since the definition of "normal" and "abnormal" may vary between the person(s) who hard-coded the thresholds and the person(s) who is monitoring the network (hereinafter referred to as "the user"), an action (e.g., providing an alarm) caused by the system due to the determination that the system is "abnormal" may not be intended by the user. This situation is known as "false alarming" or "false positive alerting".

To reduce the rate of false alarming, the user needs to understand how the system decides an anomaly in a network, as well as how to determine a threshold's appropriate configuration. Conventionally, a user would manually download network performance data from the network or extract related data from a log report (e.g., in a spreadsheet form, and the like). Subsequently, the user would analyze the data, attempt to comprehend what the data means, determine a threshold value that fulfills an intended situation, and then request the person(s) who hard-coded the thresholds to adjust the hard-coded threshold. Such an approach is burdensome for the user, particularly when the user needs to simultaneously monitor multiple thresholds and to configure multiple thresholds and/or when the user does not have depth of understanding of the network, network operating system, network components, network functions, network monitoring system, etc.

On the other hand, after receiving a request from the user, the person(s) who hard-coded the thresholds may need to review and determine whether or not the requested configuration contains any errors (e.g., a typical error may include typographical error, such as entering 1.000 while the intended value is 1,000). Nevertheless, since different users may have different methods in determining their own intended threshold's configuration, it is difficult for the person(s) who hard-coded the thresholds to determine the accuracy of the requested configurations from multiple users that use different analysis methods.

Accordingly, there is also a need to provide a unified network monitoring system which can reduce the burden of and which can fulfill the needs of both the user and the person(s) who hard-coded the thresholds.

Traditionally, a "threshold comparison" involves comparing a value with a threshold value pre-set and stored in a network monitoring system. Such traditional threshold comparison is a factor that causes the above-mentioned issues. As will be explained below, a system is provided that performs threshold comparison in a manner different from said traditional threshold comparison, thereby solving the above-mentioned issues.

FIG. 1 is a diagram of a network monitoring system 100 that facilitates network monitoring and/or generating one or more KPI management profiles, in accordance with one or more embodiments.

The network monitoring system 100 discussed with respect to FIG. 1 helps to resolve the issues discussed above. In some embodiments, the system 100 makes it possible to, instead of having the threshold values hard-coded (e.g., have the threshold values pre-set and stored in a memory), create a configuration profile (e.g., "KPI management profile") defining the conditions intended by the user to be monitored, and create a temporal dynamic baseline threshold value associated with the configuration profile for one or more process cycles.

In some embodiments, the system 100 is free from having any pre-set threshold values stored therein. Instead, the system 100 is configured to maintain user-configured KPI management profiles that define target KPIs that are to be monitored and various parameters regarding the target KPIs that are to be monitored. During network monitoring, the system 100 will, in accordance to the configuration specified in the KPI management profiles, compare current KPI data with selected historical KPI data in the user's defined manner. In some embodiments, the system 100 will create a temporary baseline threshold value for each comparison to determine whether or not the differences between the target KPI data and the selected historical KPI data fulfills conditions defined by one or more parameters as configured in a KPI management profile. In some embodiments, once the comparison and determination is complete, the temporary baseline threshold value will not be stored and the system 100 will create a new temporary baseline threshold value for a next process cycle comparison. In some embodiments, once the comparison and determination is complete, the temporary baseline threshold value will be stored so that the system 100 can use older temporary baseline threshold values to create a new temporary baseline threshold in a next process cycle comparison, for example, so that the dynamic baseline threshold value does not skew too far from a previous baseline threshold value over time.

By creating baseline threshold values based on historical KPI values and, optionally, historical baseline threshold values, the system 100 makes it possible to generate dynamic baseline threshold values that are used by system 100 to achieve similar effects to network monitoring systems having only fixed thresholds values, while solving the problems associated with fixed, or non-dynamic baseline threshold values.

In some embodiments, since the system 100 is free from having any hard-coded threshold values, and since the system 100 can automatically create an updated dynamic threshold value for each process cycle, a network apparatus' manufacturer, network vendor, network operator, or the like (e.g., "the person(s) who hard-coded the thresholds") does not need to configure the thresholds for an individual user. In some embodiments, if a dynamic threshold is itself a KPI that is to be monitored, the system 100 optionally makes it possible to create a dedicated configuration profile for monitoring the dynamic baseline threshold itself.

In some embodiments, the configuration profile provides comprehensive and well-explained information as to how a dynamic baseline threshold value is created and how the system 100 determines whether or not one or more target KPI(s) is having an anomaly. Thus, when a false alarm happens, the user can easily understand what the reason is for causing the false alarm and can quickly update the configuration profile to mitigate the false alarm. Additionally, when a third party would like to check the reason for a false alarm for the user, the system 100 makes it possible for the third party to easily understand what the reason is for causing the false alarm and provide appropriate mitigation suggestions to the user.

System 100 comprises a network management platform 101, a database 103, one or more network nodes 105, one or more network devices 107, and one or more user equipment (UE) 109. The network management platform 101, the database 103, the one or more network nodes 105, the one or more network devices 107, and/or the one or more user equipment (UE) 109 are communicatively coupled by way of network 111.

Network management platform 101 is configured to generate one or more KPI management profiles based on a plurality of parameters input by a user for tracking and/or identifying network performance. In some embodiments, network management platform 101 receives KPI data from one or more of a network node 105 or a network device 107 such as a radio station, a radio frequency (RF) emitter, or other suitable network component which is configured to communicate data to the network management platform 101 via a network protocol stack, corresponding protocol layer logs, or direct communication when identifying a current operating state of the network based on historical KPI data stored in, for example, database 103.

In some embodiments, network node 105 is an evolved node B (eNB) in fourth generation (4G), a fifth generation (5G) logical node (gNB), a new radio (NR) base station, or other suitable node. In some embodiments, network management platform 101 comprises a set of computer readable instructions that, when executed by a processor such as a processor 1803 (FIG. 18), causes network management platform 101 to perform the processes discussed in accordance with one or more embodiments. In some embodiments, network management platform 101 is remote from the network node 105 and the network device 107. In some embodiments, network management platform 101 is a part of one or more of the network node 105 or the network device 107. In some embodiments, one or more processes the network management platform 101 is configured to perform is divided among one or more of the network node 105 or the network device 107 and a processor remote from the network node 105 and/or the network device 107. In some embodiments, the network management platform 101 is at least partially implemented by a UE 109.

In some embodiments, database 103 is a centralized network repository having searchable information stored therein that includes historical KPI data, rules defining various KPIs, network functions capable of being implemented in the network involving one or more of network usage, timing, connected devices, location, network resource consumption, cost data, example network KPIs, KPI management profiles corresponding to one or more users, predefined KPI management templates accessible to be applied by one or more registered users, or other suitable element or information upon which a KPI management profile is capable of being defined and/or one or more KPIs is capable of being defined. Database 103 is a memory such as a memory 1805 (FIG. 18) capable of being queried or caused to store data in accordance with one or more embodiments.

In some embodiments, network management platform 101 generates a graphical user interface that is output to a display by way of a UE 109 or a terminal associated with network management platform 101 for a user (e.g., a network operator, a network vendor, and any personnel which would like to or is responsible to monitor the network), so as to allow the user to input or select parameters for setting or configuring threshold(s) of one or more target KPI(s) and/or action(s) that optionally occur based on a determined operating state of the network. Network management platform 101 generates a KPI management profile specified by the user based on parameters input or selected by the user, and causes the KPI management profile to be stored in database 103. In some embodiments, network management platform 101 causes the KPI management profile to be stored in a server, in a memory of a UE 109, or some other suitable location.

Subsequently, the network management platform 101 generates a dynamic baseline threshold value from historical KPI values of the one or more selected target KPI(s), based on the configurations specified in the KPI management profile. The network management platform 101 then compares current KPI value(s) of the target KPI(s) to the dynamic baseline threshold value corresponding to each target KPI, and determines whether or not the difference(s) between the current KPI data and dynamic baseline threshold value satisfy one or more condition(s) defined by the KPI management profile. In some embodiments, the network management platform 101 compares current KPI value of the target KPI(s) to one or more of the historical KPI values, compares the difference(s) between the current KPI value and the historical KPI values to the dynamic threshold value, and determines whether or not the difference(s) between said difference(s) between the current KPI value and the historical KPI values and the dynamic threshold value satisfy one or more condition(s) defined by the KPI management profile. Based on the results of the determination, the network management platform 101 then performs an appropriate action according to the KPI management profile such as sending an alert message, generating a trouble ticket, performing a remediation operation, load balancing, turning on or turning off a network element, server or network function, or some other suitable action based on a determination of whether the operating status of the network is in a normal or abnormal state.

When new KPI data is received by the network management platform 101, the network management platform 101 considers what was referred to as the "current KPI data" involved in a previous process cycle as a new historical KPI data, and the network management platform 101 generates a new dynamic baseline threshold value based on the KPI management profile, taking into consideration of the new historical KPI data. Subsequently, the network management platform 101 compares the new KPI data to the new dynamic baseline threshold value and the above-mentioned processes will be repeated for one or more future process cycles.

In some embodiments, once a KPI management profile is created and a dynamic baseline threshold value is computed, the network management platform 101 is configured to continuously monitor the target KPI(s) on the user's behalf and automatically adjust or configure the dynamic baseline threshold value based on the KPI management profile and the latest historical KPI data, thereby providing dynamic baseline threshold monitoring capabilities for a user (e.g., a user monitoring an operating state of the network).

In some embodiments, the network management platform 101 is configured to enable one user to create multiple KPI management profiles for one target KPI, to create one KPI management profile for multiple target KPIs, or to create multiple KPI management profiles for multiple target KPIs. Accordingly, the network management platform 101 makes it possible to monitor multiple target KPIs at once and automatically adjust or configure the dynamic threshold values for multiple target KPIs at once.

In some embodiments, the network management platform 101 is configured to enable multiple users to create corresponding KPI management profile(s) for the same target KPI(s). In such a configuration, the network management platform 101 makes it possible to simultaneously monitor the same target KPI(s) for multiple users, to configure and adjust the dynamic threshold value(s) of the same target KPI(s) for the multiple users in each individual defined manner, and to perform actions corresponding to each user's KPI management profile.

In some embodiments, network management platform 101 is configured to identify a KPI based on the third-generation partnership project (3GPP) protocols or similar protocol logs in a telecom network. A network node 105, for example, captures said protocol logs, counter information or a traffic pattern schema of live telecom traffic in the communication system. In this example, the network node 105 is a first entity to capture the protocol logs or traffic pattern using the 3GPP protocol stack, and extracts call process messages such as L1, L2, L3, non-access stratum (NAS) layer, telecom network intelligence messages, counter or KPI data, or other suitable protocol messages for a user defined time session or roll over period (ROP). The protocol logs are communicated to the network management platform 101 via open operation and maintenance (O&M) interfaces, for example, O-RAN interfaces, or other suitable interface for processing by the network management platform 101 and storage in database 103.

According to various embodiments, system 100 makes it possible to provide real-time and/or periodic KPI monitoring for one or more target KPIs to facilitate monitoring an operating status of the network and to identify causes of network abnormalities by way of a central network monitoring system. In some embodiments, system 100 makes it possible to autonomously alert a user of an abnormal operating status by way of an alert message or trouble ticket. In some embodiments, system 100 makes it possible to autonomously remediate an abnormal operating state identified based on the one or more target KPIs that are being monitored based on the KPI management profile. In some embodiments, the system 100 autonomously identifies the cause of an abnormal operating state and provides one or more options to remediate the abnormal operating state such that a user to which an alert message or trouble ticket is communicated has the capability of quickly and efficiently authorizing a selected remediation action to quickly and efficiently return the network to a normal operating state.

Figure 2:
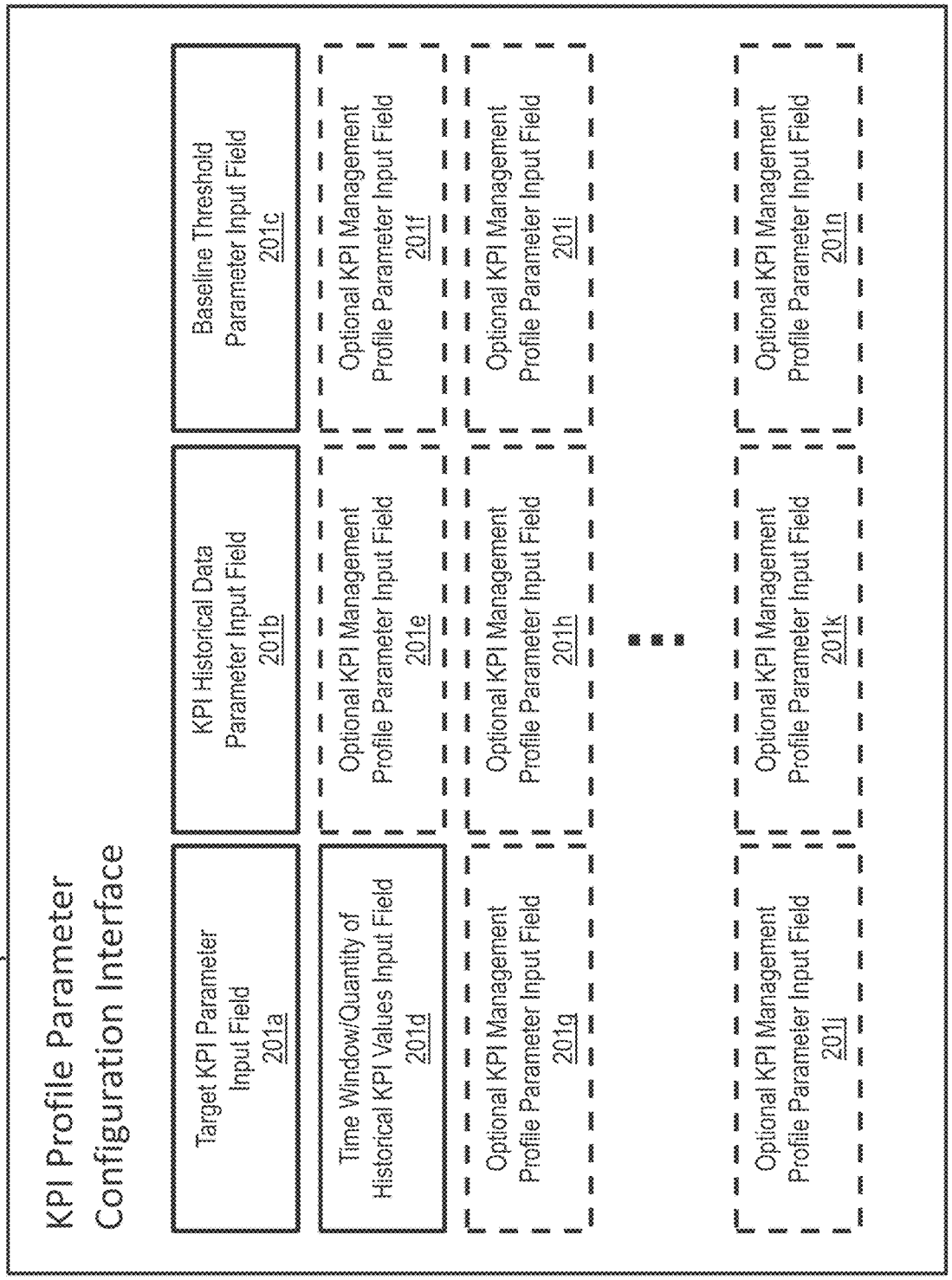
FIG. 2 is a diagram of a graphical user interface, in accordance with one or more embodiments.

FIG. 2 is a diagram of a graphical user interface 200, in accordance with one or more embodiments.

Network management platform 101 is configured to cause graphical user interface 200 to be output to a display. Graphical user interface 200 comprises a target KPI parameter input field 201*a* configured to receive a first user input identifying at least one parameter of one or more target KPIs associated with a network (e.g., network 111), a KPI historical data parameter input field 201*b* configured to receive a second user input identifying a KPI historical data parameter, a baseline threshold parameter input field 201*c* configured to receive a third user input identifying a baseline threshold parameter, and a time window/quantity of historical KPI values input field 201*d* configured to receive a fourth user input identifying a quantity of historical KPI values to be included in a set of one or more historical KPI values. In some embodiments, the graphical user interface 200 comprises one or more optional user interface fields 201*e-n* configured to receive one or more additional user inputs for designating one or more additional parameters associated with one or more target KPIs and/or one or more other parameters such as the KPI historical data parameter, the baseline threshold parameter, a location, an alert threshold, or some other suitable parameter, and/or an action such as alerting or messaging, generating a trouble ticket, identifying a recipient of an alert, message and/or trouble ticket, or performing a remediation action such as activating, modifying, or deactivating a network function, a network feature, a network element or device, performing load balancing, or some other suitable action.

Network management platform 101 processes the parameters of the target KPI, the KPI historical data, the quantity of historical KPI values, and the baseline threshold to generate a KPI management profile. The network management platform 101 validates the quantity of historical KPI values is available to be included in the set of KPI values and, in response to validating that the quantity of historical KPI values is satisfied, processes the target KPI parameter(s) and a first set of one or more historical KPI values based on the KPI historical data parameter to generate an initial baseline threshold value to which target KPI(s) data is compared to determine an operating state of the network. Network management platform 101 then causes the initial baseline threshold value to be added to the KPI management profile. In some embodiments, the initial baseline threshold value is considered as a first dynamic baseline threshold value because it is generated based on historical KPI values according to parameter setting in the KPI management profile, and may be used as a dynamic baseline threshold value in a first process cycle to which current target KPI(s) data may be compared.

In some embodiments, network management platform 101 subsequently causes a second set of historical KPI values to be generated by adding a new KPI value to the first set of the one or more historical KPI values and deleting an oldest historical KPI value of the first set of historical KPI values based on the KPI management profile. In some embodiments, the network management platform 101 queries database 103 to receive the first set of historical KPI values and to store the second set of historical KPI values.

Network management platform 101 causes a temporal dynamic baseline threshold value to be generated based on the second set of historical KPI values and causes the KPI management profile to be updated by replacing the initial baseline threshold value with the dynamic baseline threshold value. In some embodiments, the dynamic baseline threshold value is held for a predetermined period of time and/or used for one process cycle and then discarded and replaced with a new dynamic baseline threshold value for a subsequent process cycle.

In some embodiment, the KPI historical data parameter is a unit of time such as milliseconds, seconds, minutes, hours, days, weeks, months, quarters, years, or some other suitable unit of time. In some embodiments, the KPI historical data parameter defines a start point in terms of units of time for a process cycle and/or historical KPI values that are to be used in determining the dynamic baseline threshold value and/or for comparing a current KPI value to the dynamic baseline threshold value.

In some embodiments, time window/quantity of historical KPI values input field 201d is configured to receive a user input identifying a quantity of historical KPI values to be included in the first set of one or more historical KPI values and the second set of one or more historical KPI values. In some embodiments, the quantity of historical KPI values to be included in the first set of one or more historical KPI values and the second set of one or more historical KPI values is equal to a quantity of units of time designated by way of the optional user input field. For example, if a value of 10 is indicated by way of the optional user input field, and the user input field 201b indicates a value of H-1 or, one hour, then 10 historical KPI values, one for each of the last 10 hours, is included in the first set of historical KPI values. The network management platform 101 would then cause the current hourly KPI value to be added as a most recent KPI value in the second set of historical KPI values, delete the oldest historical KPI value from the previous 10 hourly KPI values, and use the other nine hourly KPI values remaining from the first set of historical KPI values and the new most recent KPI value to generate the second set of historical KPI values.

In some embodiments, one of the optional user input fields 201e-n is configured to receive a user input identifying a dynamic baseline threshold value adjustment option indicative of a quantity of the historical KPI values included in the second set of the one or more historical KPI values to be included in a calculation for generating the dynamic baseline threshold value. The quantity of the historical KPI values included in the second set of the one or more historical KPI values to be included in a calculation for generating the dynamic baseline threshold value, in this example, is less than or equal to a total quantity of available historical KPI values (e.g., based on parameters inputted into the KPI historical data parameter input field). For example, if the KPI historical data parameter input field has an inputted parameter of H-1, meaning one KPI value every hour, and an optional user input field 201e-n is included in graphical user interface 200 that indicates 10 values, another optional user input field 201e-n indicates that all 10 values are to be included in a calculation for generating the dynamic baseline threshold value or indicates that less than all of the 10 values is to be included in the calculation for generating the dynamic baseline threshold value. In some embodiments, in response to an option that all of the quantity of historical KPI values must be available to generate the dynamic baseline threshold value, but the quantity of available of historical KPI values is less than that identified as being required, network management platform 101 does not validate the quantity of historical KPI values and awaits a next process cycle for the quantity of historical KPI values to be achieved.

In some embodiments, a minimum quantity of historical KPI values that is less than the quantity of KPI values input into time window/quantity of historical KPI values input field 201d is received by way of one of the optional user input fields 201e-201n, indicating that fewer historical KPI values than those received by time window/quantity of historical KPI values input field 201d are allowable for the second set of the one or more historical KPI values.

In some embodiments, in response to the option that fewer than the quantity of historical KPI values identified as being needed to generate the dynamic baseline threshold value is available is allowed to be used, and the quantity of available of historical KPI values is less than that identified as being required, network management platform 101 validates the quantity of historical KPI values by using a minimum quantity of historical KPI values, inputting a historical KPI value in place of a missing historical KPI value that is an average of adjacent historical KPI values, a previous historical KPI value before the missing historical KPI value, a next historical KPI value after the missing historical KPI value, a historical KPI value from a prior process cycle with a timing similar to that of the missing historical KPI value, or some other suitable replacement for the missing historical KPI value so that the network management platform 101 need not await a next process cycle for the quantity of historical KPI values to be achieved. In some embodiments, the replacement option for replacing the missing historical KPI value(s) is received by way of one of the optional user input fields 201e-201n.

In some embodiments, one of the optional user input fields 201e-n is configured to receive a user input identifying a dynamic baseline threshold value adjustment option indicative of whether the quantity of the historical KPI values included in the second set of the one or more historical KPI values that are to be included in the calculation for generating the dynamic baseline threshold value are maximum values among the historical values included in the second set of the one or more historical KPI values, minimum values among the historical KPI values included in the second set of the one or more historical KPI values, or whether a mean of the historical KPI values included in the second set of the one or more historical KPI values, or some other suitable manner to aggregate values, is to be used for generating the dynamic baseline threshold value.

In some embodiments, one of the optional user input fields 201e-n is configured to receive a user input identifying a dynamic baseline threshold value adjustment option indicative of a deviation tolerance from a most recent dynamic baseline threshold value for identifying one or more outliers among the quantity of the historical KPI values that are available to be included in the calculation for generating the dynamic baseline threshold value and excluding the one or more outliers from the calculation for generating the dynamic baseline threshold value. For example, if one or more of the historical KPI values is beyond the deviation tolerance from a most recently calculated dynamic baseline threshold value for at least one corresponding target KPI, then the one or more historical KPI values may be ignored by network management platform 101 when determining a current dynamic baseline threshold value. In some embodiments, although the outlier is ignored, network management platform 101 validates the quantity of historical KPI values and proceeds with using the historical KPI values excluding the outlier even though the quantity of historical KPI values being processed is fewer than the quantity indicated in time window/quantity of historical KPI values input field 201d or one or more of the optional KPI management profile parameter input fields 201e-201n.

In some embodiments, network management platform 101 is configured to replace a historical KPI value that is identified as being an outlier with an average of adjacent historical KPI values surrounding the outlier, a previous historical KPI value before the outlier, a next historical KPI value after the outlier, a historical KPI value from a prior process cycle with a timing similar to that of the outlier, or some other suitable replacement for the outlier so that the network management platform 101 need not await a next process cycle for the quantity of historical KPI values to be achieved. In some embodiments, the replacement option for replacing the outlier is received by way of one of the optional user input fields 201e-201n.

In some embodiments, the baseline threshold parameter received by way of baseline threshold parameter input field 201c designates a deviation manner from the dynamic baseline threshold value, the deviation manner being one of greater than the dynamic baseline threshold value, less than the dynamic baseline threshold value, or different from the dynamic baseline threshold value. In some embodiments, the deviation manner is a difference by a specified degree. In some embodiments, one of the optional user input fields 201e-n is configured to receive a user input identifying a tolerance range from the dynamic baseline threshold value, wherein the tolerance range is with respect to the dynamic baseline threshold and according to the deviation manner. In some embodiments, one of the optional user input fields 201e-n is configured to receive a user input identifying a tolerance type corresponding to the tolerance range, wherein the tolerance type is one of a percentage, an integer, a ratio, a standard deviation, or some other suitable quantifier.

In some embodiments, the target KPI parameter input field 201a is configured to receive one or more inputs identifying multiple target KPIs associated with a network. In some embodiments, one of more of the KPI historical data parameter input field 201b or the baseline threshold parameter input field 201c is configured to receive multiple inputs identifying KPI historical data parameters corresponding to the multiple target KPIs or multiple inputs identifying baseline threshold parameters corresponding to the multiple target KPIs.

In some embodiments, the network management platform 101 is configured to process KPI values received from a network node to determine the operating state of the network based on a comparison of the received KPI value and the initial baseline threshold value or the dynamic baseline threshold value in accordance with the baseline threshold manner defined by the baseline threshold parameter and cause an alert message to be communicated to a user associated with the KPI management profile and/or a recipient of the alert message identified in the KPI management profile, in response to a determination that the operating state of the network is abnormal based on the KPI management profile.

In some embodiments, one of the optional user input fields 201e-n is configured to receive a user input identifying a predefined schedule for reporting the operating state of the network to a user associated with the KPI management profile and, in addition to reporting alerts or alarms for the network being in an abnormal operating state, the network management platform 101 can also cause a message to be communicated to a user associated with the KPI management profile and/or identified in the KPI management profile indicating the operating state of the network based on predefined schedule indicated in the KPI management profile. For example, regardless of whether the operating state of the network is normal or abnormal, the message indicating the operating state of the network is communicated to provide a status report for operating state of the network and/or the KPI(s) being monitored.

In some embodiments, one of the optional user input fields 201e-n is configured to receive a user input identifying an alert message priority as being in an active or an inactive state, and the network management platform 101 causes an alert to be communicated to the user associated with the KPI management profile indicating the operating state of the network is abnormal irrespective of the predefined schedule based on the alert message priority being set to the active state and cause the message to be communicated to the user associated with the KPI management profile indicating the operating state of the network based on the predefined schedule.

In some embodiments, one of the optional user input fields 201e-n is configured to receive a user input identifying a remediation action to be taken in response to a determination by network management platform 101 that the operating status of the network is in an abnormal state. In some embodiments, the remediation action is automatically implemented by network management platform 101. In some embodiments, the remediation action is provided to the user associated with the KPI management profile and/or the recipient identified in the KPI management profile for approval before implementation. In some embodiments, network management platform 101 provides one or more remediation action options to resolve the determined abnormal operating state. In some embodiments, network management platform 101 causes the options to be provided by way of the alert message, trouble ticket, or by way of some other suitable communication or user interface.

In some embodiments the available remediation actions, option to proceed autonomously or option to seek approval are received by way of one or more of the optional user input fields 201e-201n.

In some embodiments, one or more of the user input fields 201a-201n comprises two or more selectable options corresponding to available KPIs in the user input field 201a, available KPI historical data parameters in the user input field 201b, available baseline threshold parameters in the user input field 201c, or other suitable options of available parameters. Some options are optionally provided by way of one or more of drop-down boxes, pop-out windows, radio buttons, check boxes, selectable links, selectable fields, or some other suitable option. In some embodiments, one or more of the input fields 201a-201n is capable of receiving text or code entered into the input field.

According to various embodiments made possible by the inclusion of one or more different combinations of user input fields 201a-201n, including those discussed as examples, or any additional user input fields optionally added to the graphical user interface, the network management platform 101 processes the target KPI(s), the KPI historical data parameter(s) (e.g., the quantity of historical KPI data), the baseline threshold parameters(s) (e.g., the dynamic baseline threshold adjustment options), the tolerance range, the tolerance type, the predefined schedule, the alert message priority, the notification type, the remediation option(s), and/or other suitable parameter to generate the KPI management profile The user can manually input the parameters into the user input fields (e.g., via keyboard, voice control, and the like). Alternatively, the user input fields can provide (in the form of a drop-down list, pop-out window, or some other suitable options) available parameters or parameters suggested by the network management platform 101 based on other inputted/selected parameters, and the user can simply select the available parameters from the drop-down list, pop-out window, or other suitable options. On the other hand, the user can simply input a keyword(s) into the user input fields, and the user input fields will then provide a drop-down list comprises available and/or suggested parameters associated with the keyword(s).

In some embodiments, the network management platform 101 is configured to monitor and adjust thresholds of a KPI based on multiple KPI management profiles, each of which maybe a preferred threshold configuration of a different user or maybe a preferred threshold configuration of a same user.

Figure 3:
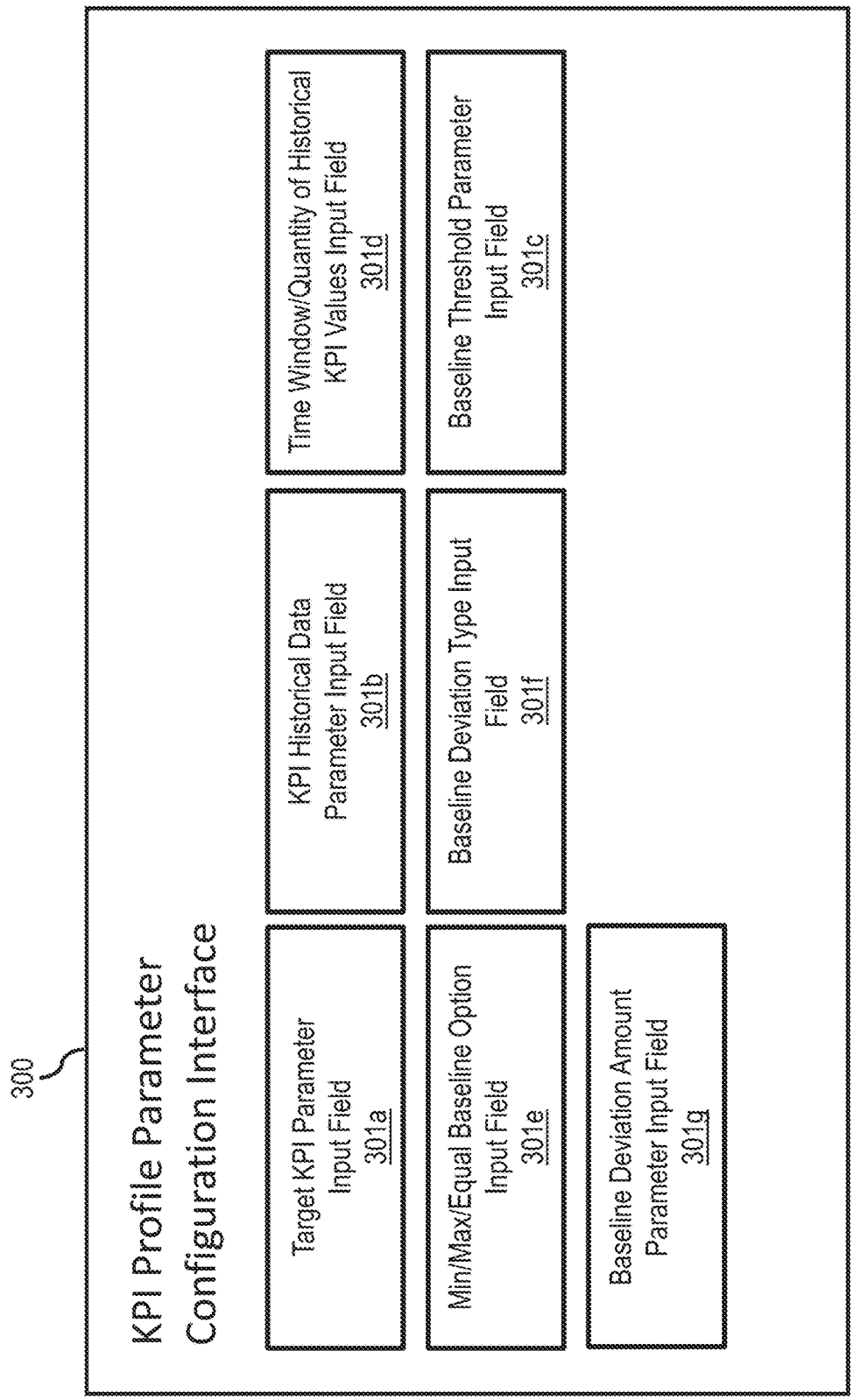
FIG. 3 is a diagram of a graphical user interface, in accordance with one or more embodiments.

FIG. 3 is a diagram of a graphical user interface 300, in accordance with one or more embodiments. Graphical user interface 300 is an example embodiment of graphical user interface 200 (FIG. 2), with similar features having the corresponding reference numerals increased by 100.

Graphical user interface 300 includes seven user input fields. A first user input field 301a is configured to receive a user input indicative of one or more target KPI parameter(s), a second user input field 301b configured to receive a user input indicative of a historical KPI value parameter, a third user input field 301c configured to receive a user input indicative of a manner of deviation from the dynamic baseline threshold value for determining the operating state of the network (e.g., greater than; less than; equal to; both greater than and less than; great than=abnormal, less than=normal, equal to=normal; greater than=normal, less than=abnormal, equal to=normal; or some other suitable direction combination of manners for designating normal and/or abnormal operating states), a fourth user input field 301d configured to receive a user input indicative of a quantity of historical KPI values to be included in a set of historical KPI values for determining a dynamic baseline threshold value for a target KPI, a fifth user input field 301e configured to receive a user input indicative of whether a maximum value, a minimum value, and/or a mean value of the historical KPI values are to be used to calculate the dynamic baseline threshold value for the target KPI, a sixth user input field 301f configured to receive a user input indicative of a comparison type (e.g., percentage, integer, range of percentages or integers, or other suitable measurable degree of value), and a seventh user input field 301g configured to receive a user input indicative of an amount of deviation that corresponds to the comparison type.

Although graphical user interface 300 is described as having seven user input fields, in some embodiments, graphical user interface 300 has a different quantity of user interface fields. For example, in some embodiments, the configuration of parameters for determining the dynamic baseline threshold value may pre-configured, and thus, the network management platform 101 provides graphical user interface 300 without including input fields related to configuring the dynamic baseline threshold value (e.g., user input fields 301c, 301e, 301f, 301g). In some embodiments, graphical user interface 300 includes more than the seven user input fields 301a-301g, enabling the user to configure the dynamic baseline threshold value(s) and corresponding action(s) in a more detailed manner.

Figure 4:
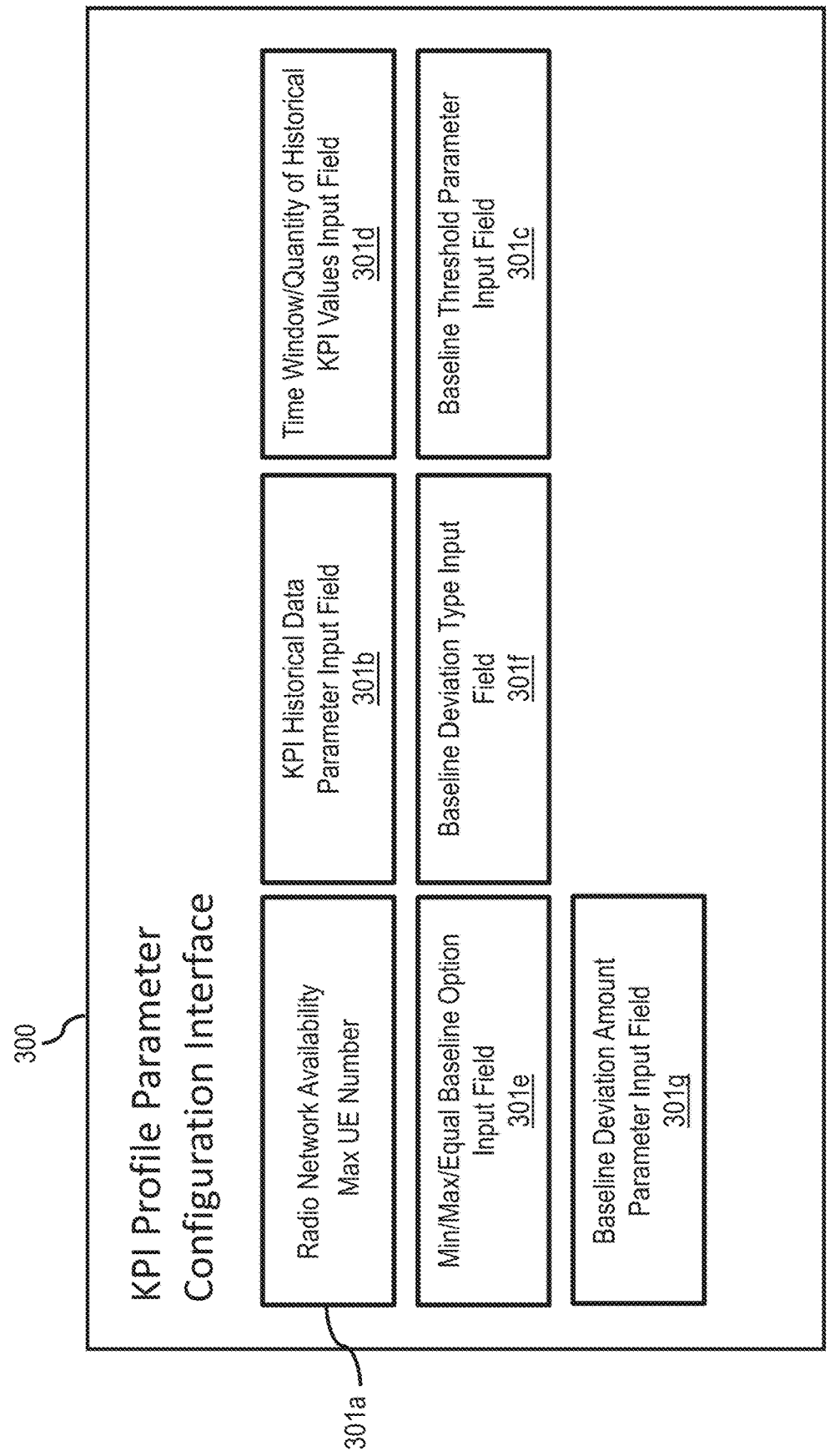
FIG. 4 is a diagram of a graphical user interface, in accordance with one or more embodiments.

FIG. 4 is diagram of a graphical user interface 300, in accordance with one or more embodiments.

In this example of graphical user interface 300, the user input field 301a includes two target KPIs, Radio Network Availability and Max UE Number. The user input field 301a, having the two target KPIs was either filled manually or by way of a selection from a drop-down box or a list of available KPIs to be tracked. In some embodiments, to facilitate manual input of KPIs, the network management platform 101 searches database 103 for target KPIs matching the user input and populates user input field 301a with the corresponding KPI(s) available in database 103. Alternatively, if the user input field 301a is configured having a drop-down list comprising available target KPI(s), graphical user interface 300 enables a user to select one or more of the available target KPI(s) to be included in user input field 301a, and network management platform 101 appropriately populates user input field 301a. While user input field 301a is illustrated as having two target KPI(s), user input field 301a is capable of receiving any quantity of target KPIs that are available or designated to be tracked by a user. In some embodiments, one target KPI is added to user input field 301a. In some embodiments, network management platform 101 is capable of tracking up to and beyond 14,000 different target KPIs related to various domains, vendors, technologies, network functions, locations or the combinations thereof as a greater quantity of target KPIs are further developed in the future. In some embodiments, network management platform 101 is configured to limit the quantity of KPIs that are to be tracked according to a KPI management profile to a specified quantity that is less than the quantity of available target KPIs to conserve system resources and avoid reduced processing speeds. For example, a KPI management profile that tracks 20 KPIs consumes fewer system resources compared to KPI management profile that tracks 1,000 KPIs.

In some embodiments, user interface field 301a facilitates a keyword search for target KPIs that are available in a drop-down list and/or in database 103 for optional selection and inclusion in the KPI management profile.

Some example KPIs eligible to be target KPIs may include, but should not be considered limited to, Max UE Number (e.g., defining a maximum quantity of connected UE 109's, Radio Network Availability Rate LTE (e.g., defining a percentage of network availability time in LTE), Web_Submitting (e.g., defining a total quantity of sim cards submitting orders), VM CPU Peak Utilization (e.g., defining a maximum peak CPU utilization), Memory Average Usage (e.g., defining an average memory utilization), Throughput-System-Mbps (e.g., defining a total system throughput in Mbps), Radio Network Availability Rate 5G (e.g., defining a percentage of cell availability time in 5G), Sector DL Throughput Mbps (e.g., defining sector downlink throughput in Mbps), DL Traffic Volume (e.g., defining total downlink traffic), total_messages (e.g., defining a total quantity of messages sent), variations or combinations thereof associated with a domain type such as, but not limited to, RAN, BSS, CORE or Security, different vendors, device manufacturers, network service providers, network names, etc., or technologies such as LTE, 5G, some other future developed protocol, or some other suitable factor.

Figure 5:
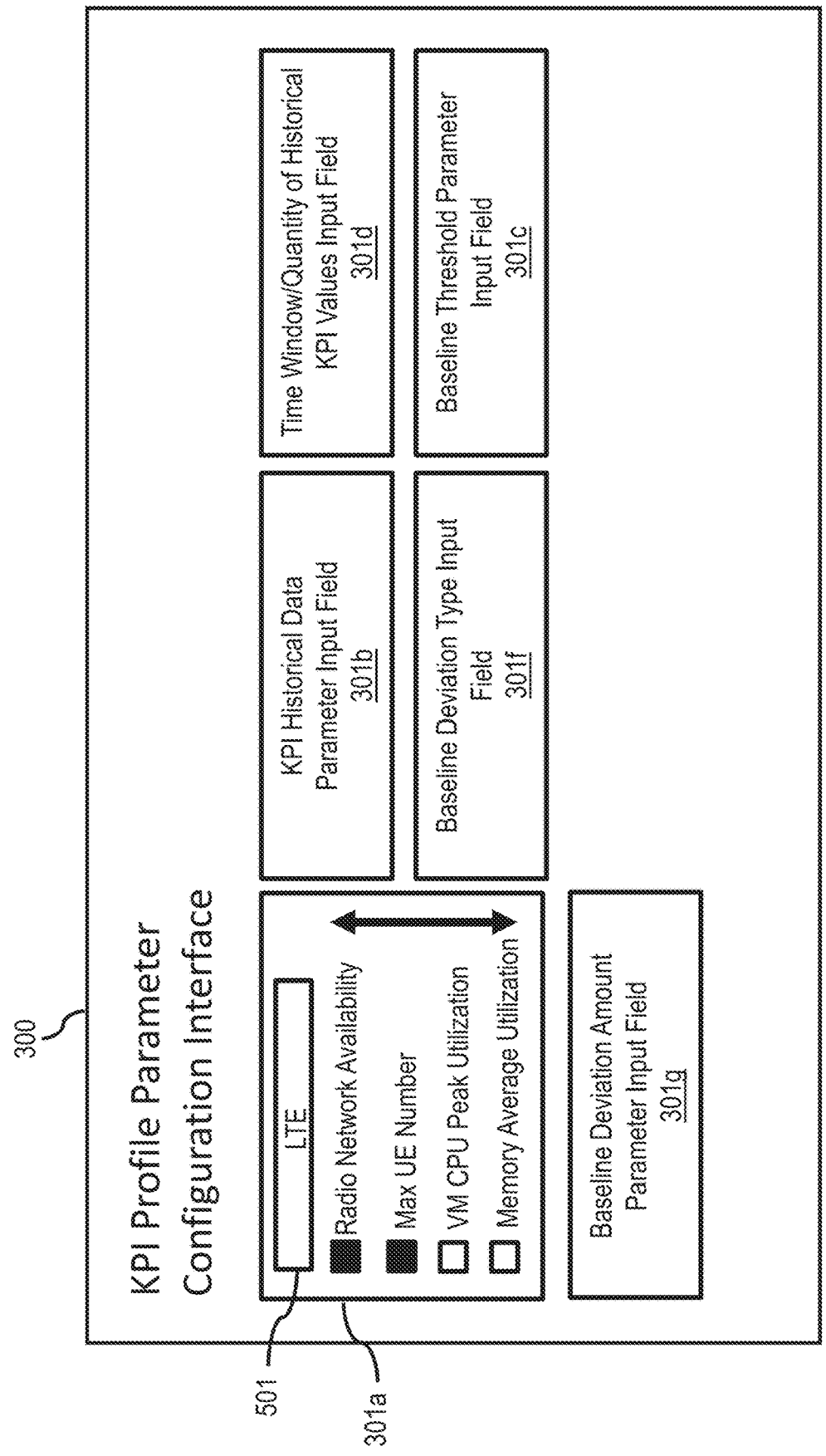
FIG. 5 is a diagram of a graphical user interface, in accordance with one or more embodiments.

FIG. 5 is a diagram of graphical user interface 300, in accordance with one or more embodiments.

In this example of graphical user interface 300, the user input field 301a includes a keyword search field 501 within which "LTE" has been entered. Based on the keyword "LTE" being entered, network management platform 101 searches database 103 for KPIs associated with the technology, "LTE". Here, four potential target KPIs are shown in a viewable portion of user input field 301a and an option is provided to scroll through additional options. In some embodiments, more or less than four potential target KPIs are displayed. Radio Network Availability and Max UE Number are selected and added as target KPIs in the KPI management profile. In some embodiments, one or more of the KPIs available for search in the database 103 are associated with numerical tags, such as "1013." So, if a user inputs "1013" into the keyword search field 501, network management platform 101 searches database 103 for potential target KPIs available which are associated with the term "1013."

In some embodiments, one or more of network management platform 101 or graphical user interface 300 is configured to limit a quantity of selectable KPIs. A limitation in this regard is with respect to a quantity of selectable KPIs presented in the viewable portion of user input field 301a, a quantity of selectable KPIs presented in user input field 301a upon scrolling, and/or a quantity of KPIs allowed to be selected for inclusion in a KPI management profile. For example, if a quantity of selectable KPIs is limited, the reduction in selectable KPIs from an exorbitant quantity of KPIs helps to reduce system resource utilization and/or time that a user may take to select one or more target KPIs for inclusion in a KPI management profile. In some embodiments, an active limitation causes a set of most popular KPIs to be available for selection, or a set of most recently selected KPIs to be available for selection. In some embodiments, the network management platform 101 determines a user ID associated with the user, searches the database 103 for other existing KPI values associated with the user ID or a job function associated with the user ID, and provides a limited set of selectable KPI values based on other KPI management profiles that the user has created and/or the job function of the user. In some embodiments, input field 301a optionally comprises an override option to deactivate any limitations on selectable KPIs, or to expand the quantity of selectable KPIs. In some embodiments, the quantity of selectable KPIs is unlimited.

For example, if upon receipt of a user input, network management platform 101 finds 100 associated KPIs in database 103, a base level active limitation setting of graphical user interface 300 is to allow 10 KPIs to be displayed and 4 KPIs to be selected. Then, if the user would like to allow expansion to 20 KPIs, the user may deactivate the base level active limitation and activate a medium display level limitation, then 20 KPIs may be displayed (either in one view or by scrolling) to provided additional options for the user to select. Additionally, if a medium selection level limitation is activated, the user may select a greater quantity of KPIs (this may be done with or without changing the display level limitation). Similarly, if a high display level limitation is activated all limitations on the quantity of KPIs allowed to be displayed are removed, and/or if a high selection level limitation is activated all limitations on the quantity of KPIs allowed to be selected are deactivated. So, in this example, a user could view and select up to 100 target KPIs at any time for inclusion in a KPI management profile is all of the display and selection limitations are deactivated. In some embodiments, the multiple target KPIs are presented in a user's preferred order determined by the network management platform 101 based on user's personal profile, user's search history, or any suitable information. In some embodiments, network management platform 101 facilitates any quantity of display and/or selection level limitations to be implemented and any quantity of KPI values to be selected for inclusion as target KPIs in a KPI management profile.

In some embodiments, one or more of the other user input fields 301b-301n is configured to receive multiple inputs identifying corresponding KPI management parameters associated with a specific target KPI selected for inclusion in the KPI management profile or associated with a combination or sub-combination of target KPIs selected for inclusion in the KPI management profile.

Figure 6:
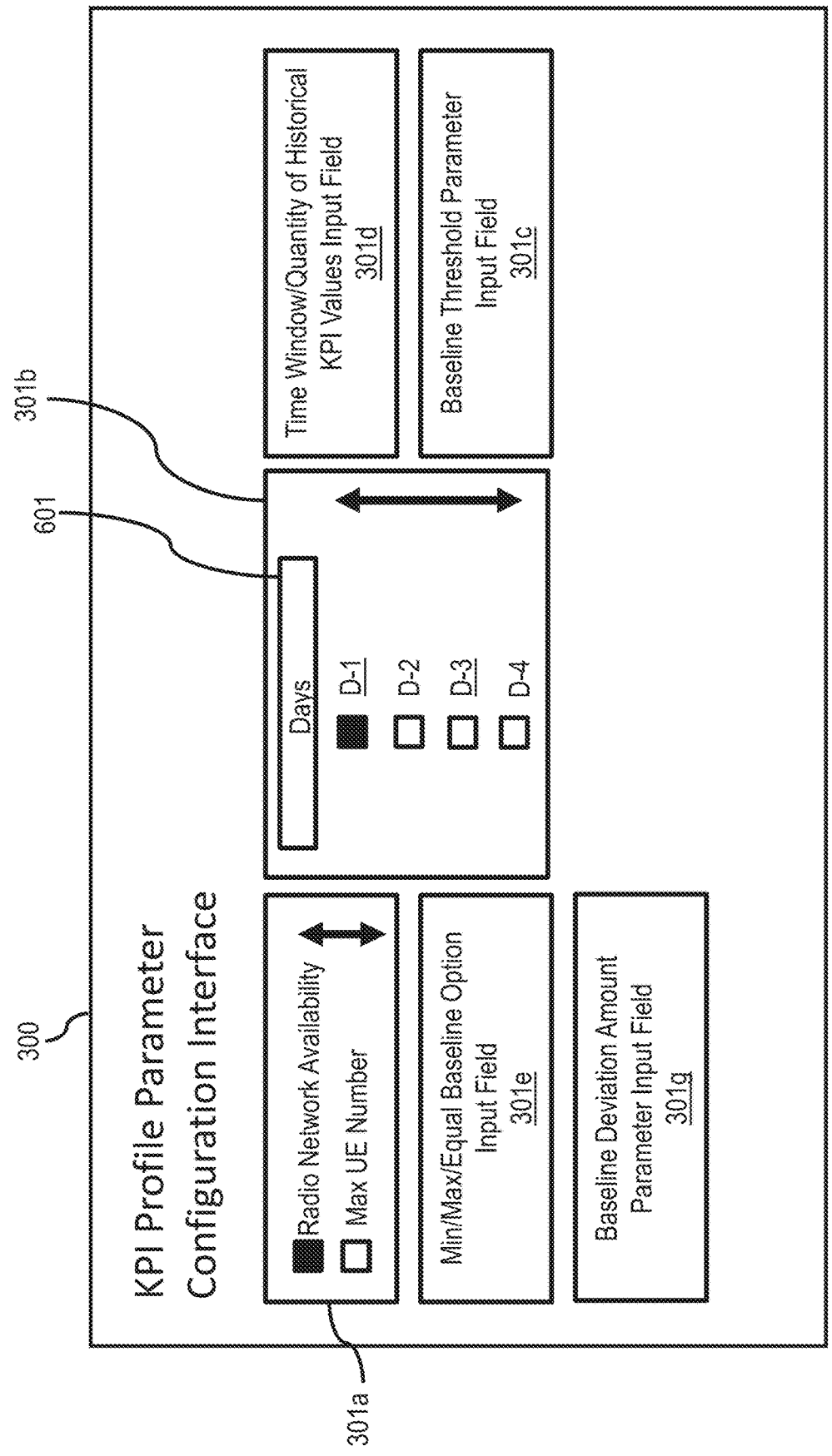
FIG. 6 is a diagram of a graphical user interface, in accordance with one or more embodiments.

FIG. 6 is a diagram of graphical user interface 300, in accordance with one or more embodiments.

In this example of graphical user interface 300, the user input field 301b includes a keyword search field 601 in which "Days" has been entered. Here, a user inputs "Days" as a unit of time for monitoring Radio Network Availability, which was previously selected as the target KPI, for assigning the unit of time for monitoring the target KPI, Radio Network Availability. Based on the keyword "Days" being entered, network management platform 101 searches database 103 for available options for how many days are capable of being selected and provides a selectable list of values in user input field 301b. In some embodiments, alternative lists of units of time may be entered into keyword search field such as, but not limited to, milliseconds, seconds, minutes, hours, weeks, months, years, quarters, weekends, Monday, Tuesday, Wednesday, Thursday, Friday, Saturday, Sunday, or some other suitable distinction. One or more of the options for unit of time may be selected at once. In some embodiments, if both Radio Network Availability and Max UE are selected in user input field 301a, then the selections in user input field 301b would apply to both selected target KPIs. In some embodiments, user input field 301b displays all available units of time for monitoring the selected target KPIs if no input is received by keyword search field 601 or if user input field 301b is without keyword search field 601.

Figure 7:
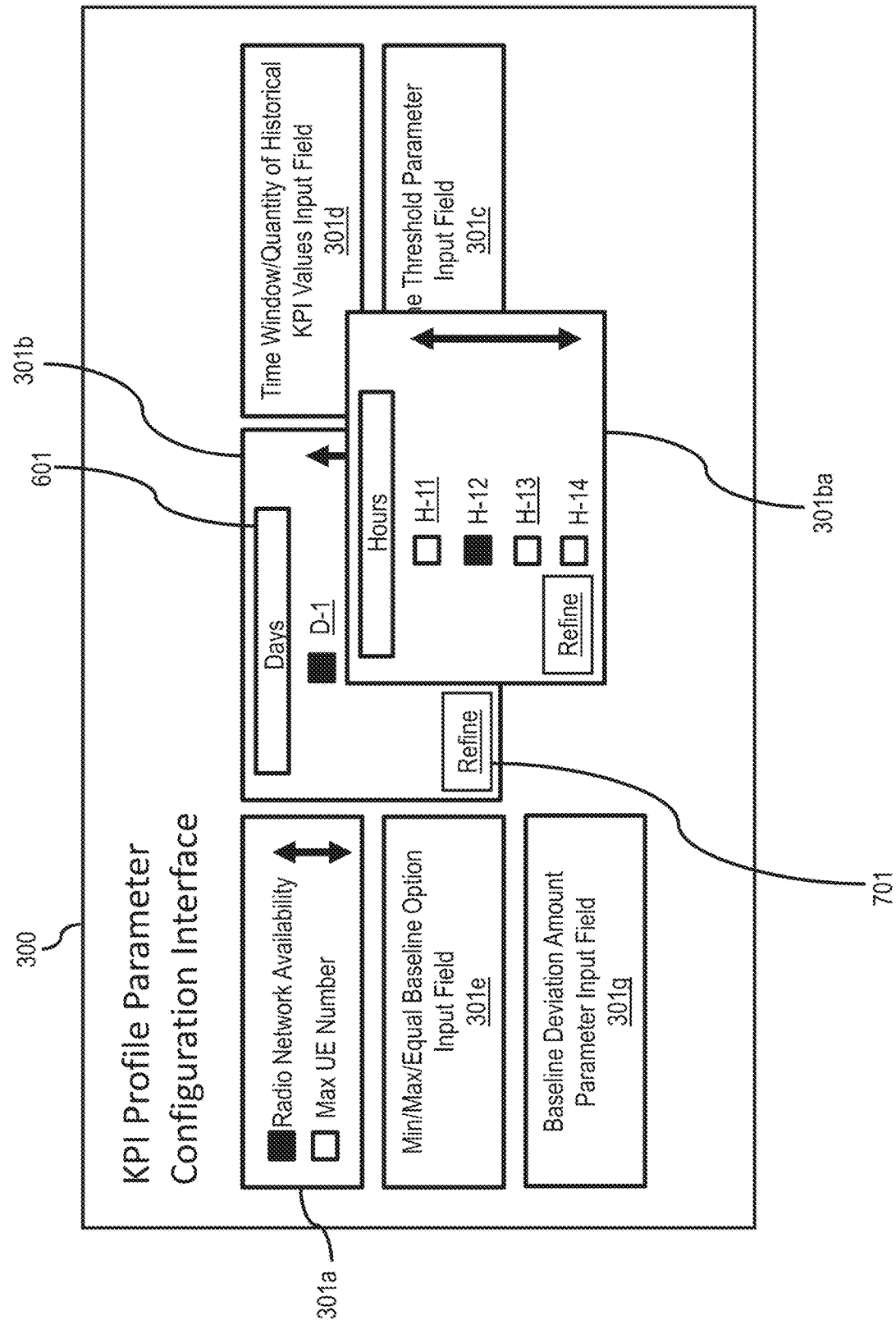
FIG. 7 is a diagram of a graphical user interface, in accordance with one or more embodiments.

FIG. 7 is a diagram of graphical user interface 300, in accordance with one or more embodiments.

In this example of user interface 300, D-1 (e.g., day one) is selected and user input field 301b includes a refinement option 701 that, if toggled, causes the network management platform 101 to cause a sub-menu 301ba to be displayed. Sub-menu 301ba has the same capabilities and windows as those discussed above with respect to user input field 301b in FIG. 6 and provides the user with an opportunity to further tailor the unit of time input by way of one or more sub-levels of refinement. For example, if D-1 is firstly selected, and refinement option 701 is further selected, and "Hours" is subsequently added to the corresponding keyword search field in the sub-menu 301ba, then hours H-1 to H-23 may be available for selection. So, if for example, D-1 is selected, and hour H-12 is selected in the sub-menu 301ba, then historical KPI values for days D-1 at hour H-12 will be added to the set of historical KPI values included in the determination of the dynamic baseline threshold value and/or as a time when a comparison is made to determine the operating state of the network. The quantity or occurrence of when the values for D-1 at hour H-12 is then based on a user input received by way of user input field 301d.

In some embodiments, instead of D-1 indicating "Day One" and instead of H-12 indicating "Hour 12", D-1 refers to present day minus 1, or yesterday, and H-12 refers to current hour minus 12, and other similar units of time, in such an embodiment, correspond to the same pattern.

In the case, where D-1 is the current day minus one, assuming that the quantity indicated in user input field 301d is "7", the network management platform 101 searched database 103 for historical KPI values of "one day before the present day" 7 times. Assuming that the present day "D" is Friday, the network management platform 101 will retrieve the historical KPI values of Thursday (i.e., one day before Friday), Wednesday (i.e., one day before Thursday), Tuesday, Monday, Sunday, Saturday, and Friday of the previous week. Subsequently, the network management platform 101 determines a dynamic baseline threshold value based on the retrieved historical KPI values, and then compares current KPI data value(s) of the present day to the dynamic baseline threshold value to determine whether or not the difference(s) between the current KPI data value(s) of the present day and the dynamic baseline threshold value satisfy one or more of the threshold parameters defined in the KPI management profile to determine the operating state of the network.

In some embodiments, units of time and the quantity of historical KPI values are limited according to the type of unit of time involved. For example, days may be limited to D-1, D-2, up to D-30, D-month, D-week, etc. Hours may be limited to H-1, H-2, up to H-23, H-day, H-week, etc. Quarters (e.g., 15 mins or quarter year), may be limited to Q-1, Q-2, up to Q-16, Q-day, Q-week, etc. Minutes, seconds, milliseconds, or other suitable types of units of time may be similarly limited according to suitable quantities that correspond to the type of unit of time.

Figure 8:
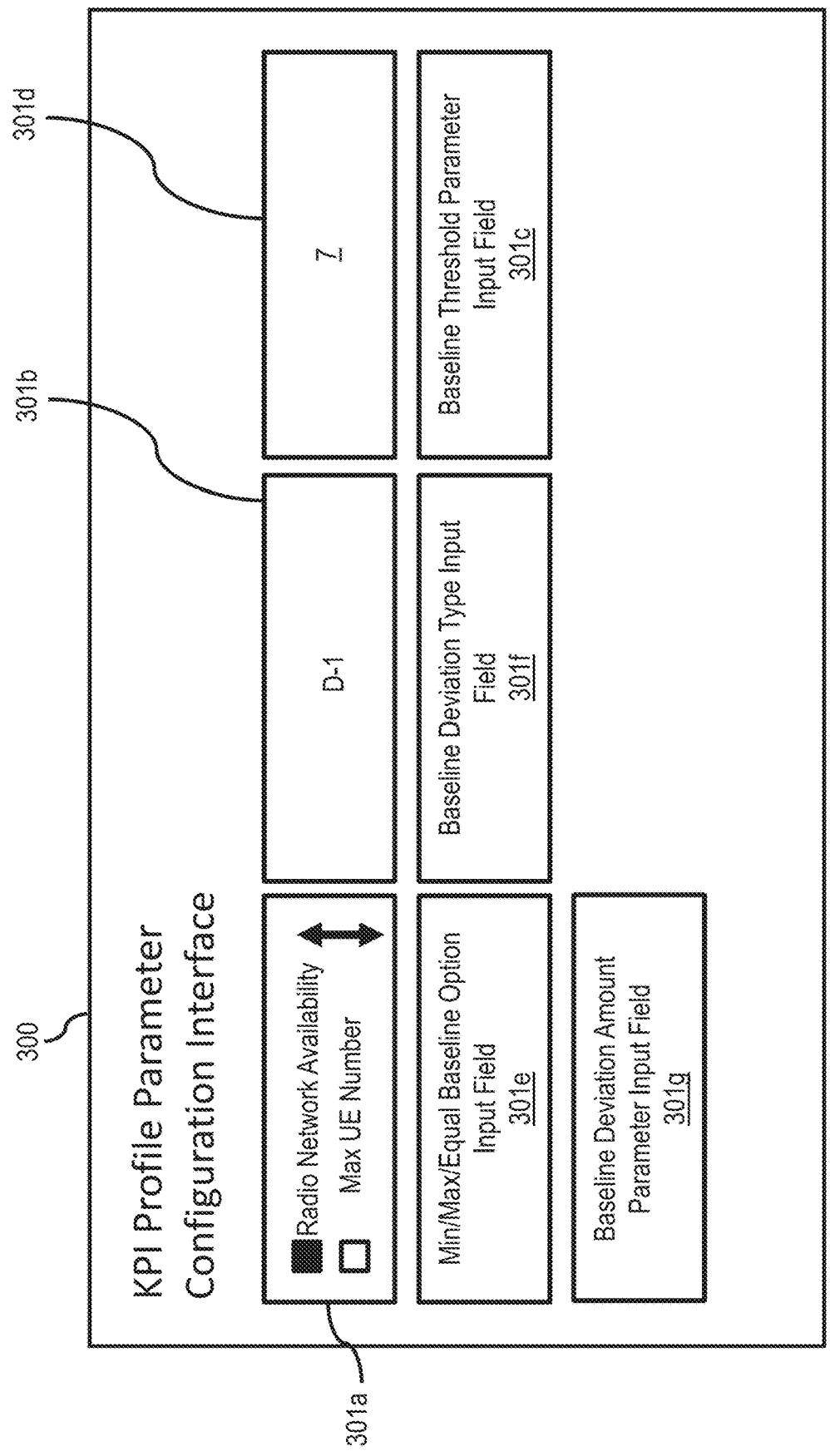
FIG. 8 is a diagram of a graphical user interface, in accordance with one or more embodiments.

FIG. 8 is a diagram of graphical user interface 300, in accordance with one or more embodiments.

In this example of graphical user interface 300, the user input field 301d includes a quantity, "7", input by a user for a quantity of historical KPI values to be included in the set of historical KPI values used to calculate the dynamic baseline threshold value, and/or a time window or occurrence rate for obtaining historical KPI values or a time window or occurrence rate for determining the operating state of the network. In some embodiments, similar to other user input fields 301a and 301b, user input 301d optionally includes a drop-down menu of selectable quantity options for selection. In some embodiments, the selectable quantity options correspond to one or more of the target KPI(s) added to user input field 301a and subsequently selected for parameter definition or the unit(s) of time indicated in user input field 301b. In some embodiments, user interface field 301d optionally comprises a keyword search field for entry of search terms to find an appropriate quantity to designate in user input field 301d. In some embodiments, the network management platform 101 searches database 103 for preset selectable time quantities based on the target KPI(s) selected in user input field 301a and pre-populates the drop-down box. In some embodiments, the network management platform 101 searches database 103 for preset selectable time quantities based on an input into the keyword search field for time quantities corresponding searched target KPI(s).

Figure 9:
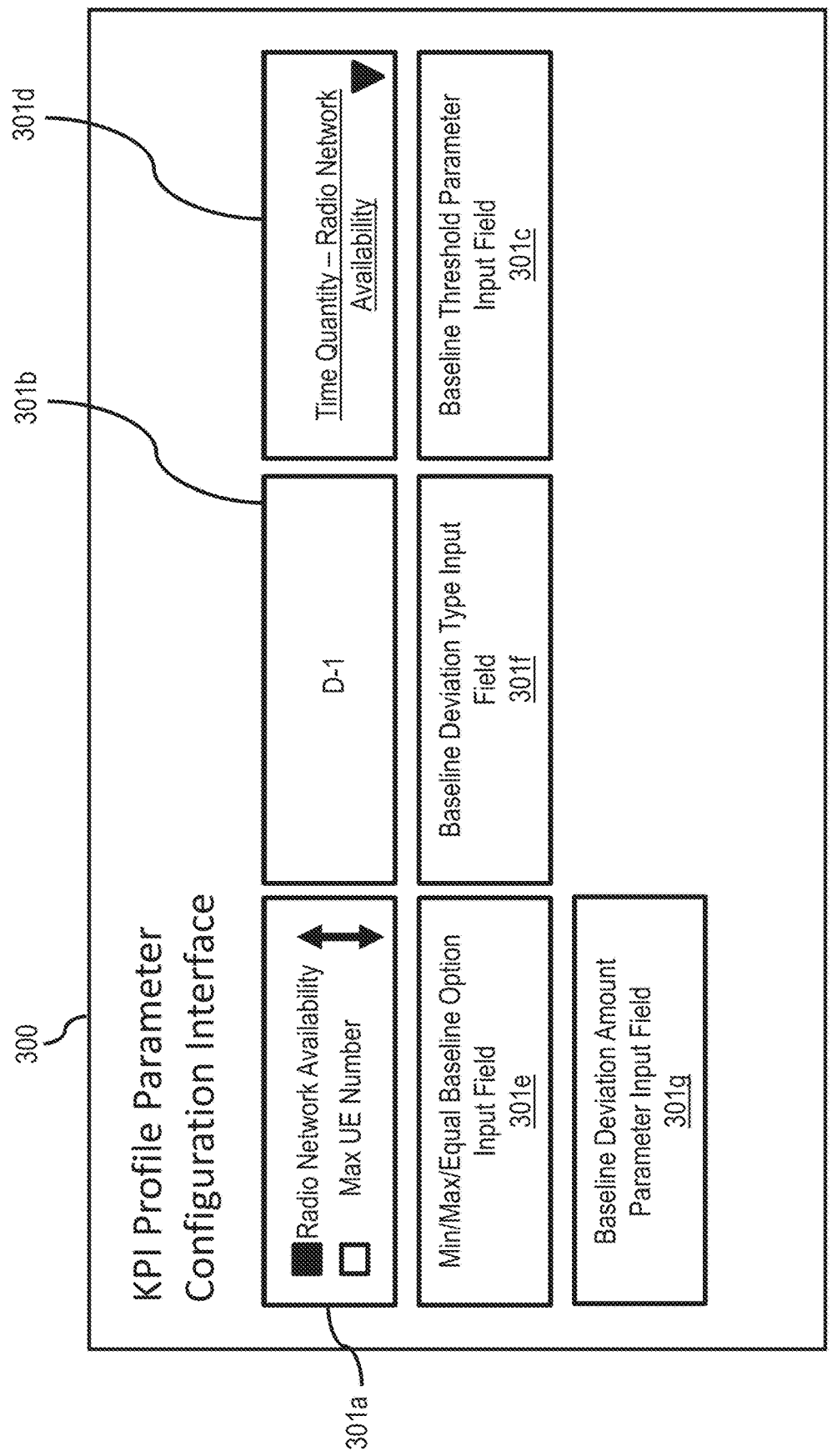
FIG. 9 is a diagram of a graphical user interface, in accordance with one or more embodiments.

FIG. 9 is a diagram of graphical user interface 300, in accordance with one or more embodiments.

In this example of graphical user interface 300, the user input field 301d includes a drop-down list of a suggested quantity determined by the network management platform 101 based on parameters entered in other user input fields such as the target KPI(s) entered in user input field 301a, the unit of time entered in user input field 301b, some other suitable parameters entered in user input field 301c or 301e-n, or based on a user input received by way of a keyword search field included in user input field 301d. Although the time quantity is populated with a preset time quantity corresponding to target KPI, RAN Network Availability, other options are available in the drop-down list option included in user input field 301d.

Figure 10:
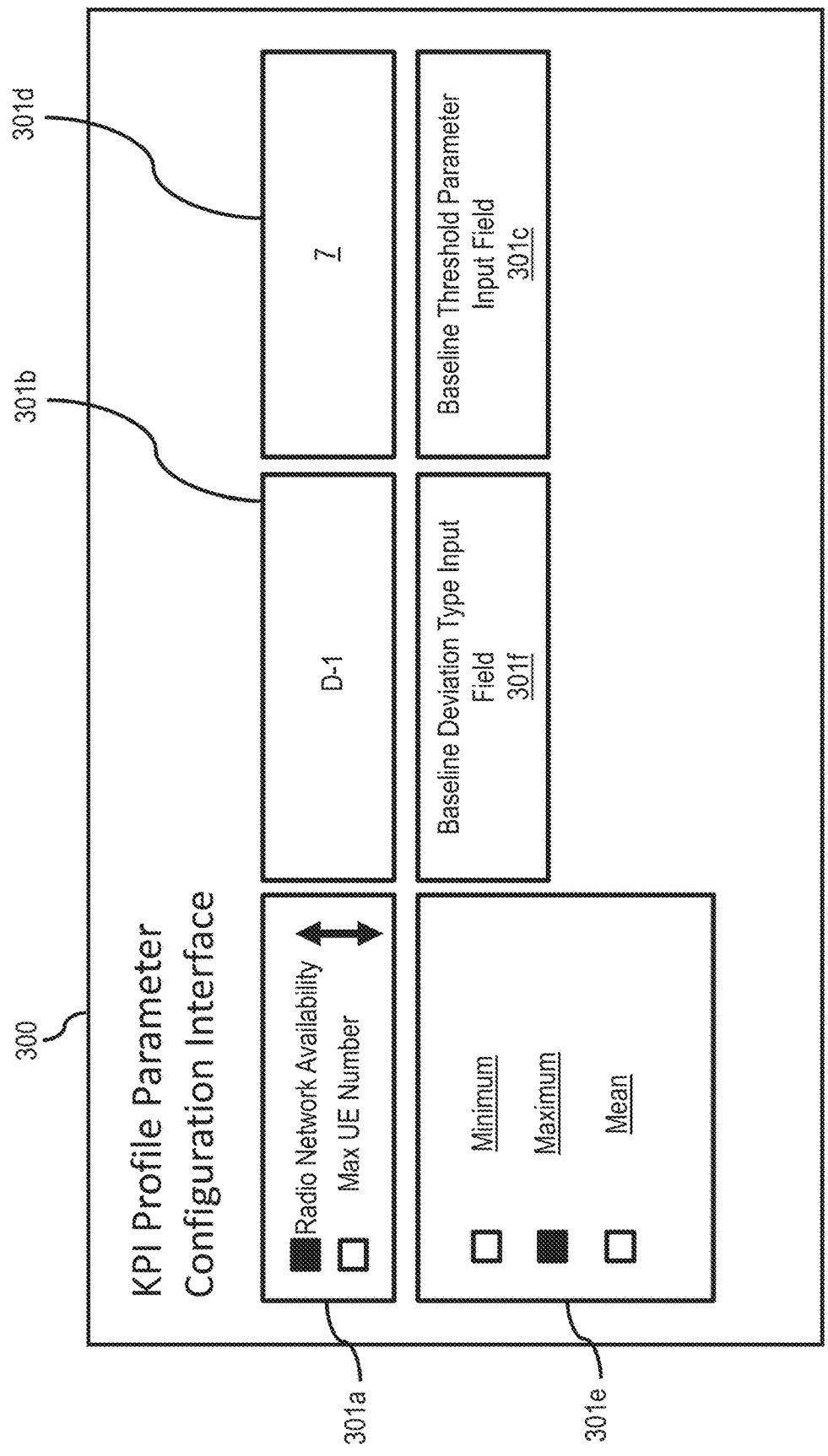
FIG. 10 is a diagram of a graphical user interface, in accordance with one or more embodiments.

FIG. 10 is a diagram of graphical user interface 300, in accordance with one or more embodiments.

In this example of graphical user interface 300, the user input field 301e includes a drop-down box of historical KPI value selection options including minimum, maximum and mean. In some embodiments, a selection of minimum, maximum or mean indicates a type of dynamic baseline threshold value that is to be determined. In some embodiments, a selection of minimum, maximum or mean indicates a type of historical KPI values that are to be included in the set of historical KPI values used to determine the dynamic baseline threshold value. Similar to other user input fields 301, user input field 301e optionally includes a keyword search field in which a user optionally manually inputs the parameter and/or network management platform 101 searches database 103 for corresponding parameters, or the user is provided with an option to select one or more preset parameters by way of the drop-down box.

In some embodiments, although discussed above and illustrated in FIG. 10 as having available parameter options as "Max", "Min", and "Mean", other functions like "Standard Deviation", "Variance," or some other suitable value is possible.

Figure 11:
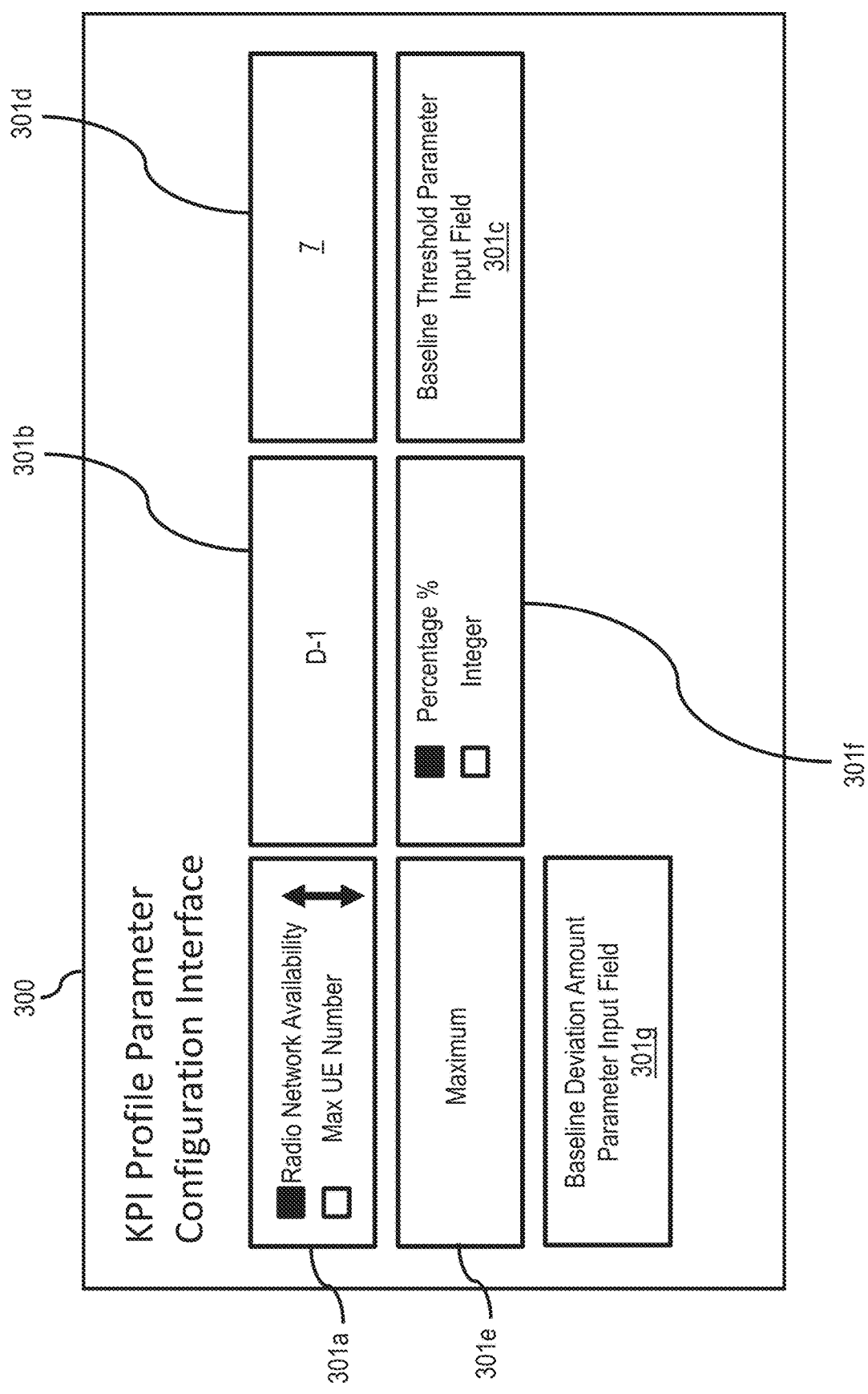
FIG. 11 is a diagram of a graphical user interface, in accordance with one or more embodiments.

FIG. 11 is a diagram of graphical user interface 300, in accordance with one or more embodiments.

In this example of graphical user interface 300, the user input field 301f includes a drop-down box of options for how the dynamic baseline threshold value is to be calculated. In some embodiments, the parameter indicated in user input field 301f also indicates how any deviation from the baseline threshold value is to be compared. For example, user input field 301f includes options percentage % and integer. In some embodiments, a preset parameter corresponding to the selected target KPI is included in user input field 301f based on a search by network management platform 101 for a corresponding value in database 103. In some embodiments, similar to other user input fields 301, user input field 301f includes a keyword search field in which the user can manually input a keyword associated with the parameter type and initiates a search for an appropriate parameter corresponding to the selected target KPI value, or select an option provided in the drop-down box. In some embodiments, other parameter types are possible such as, "ratio", or some other suitable comparative format.

Figure 12:
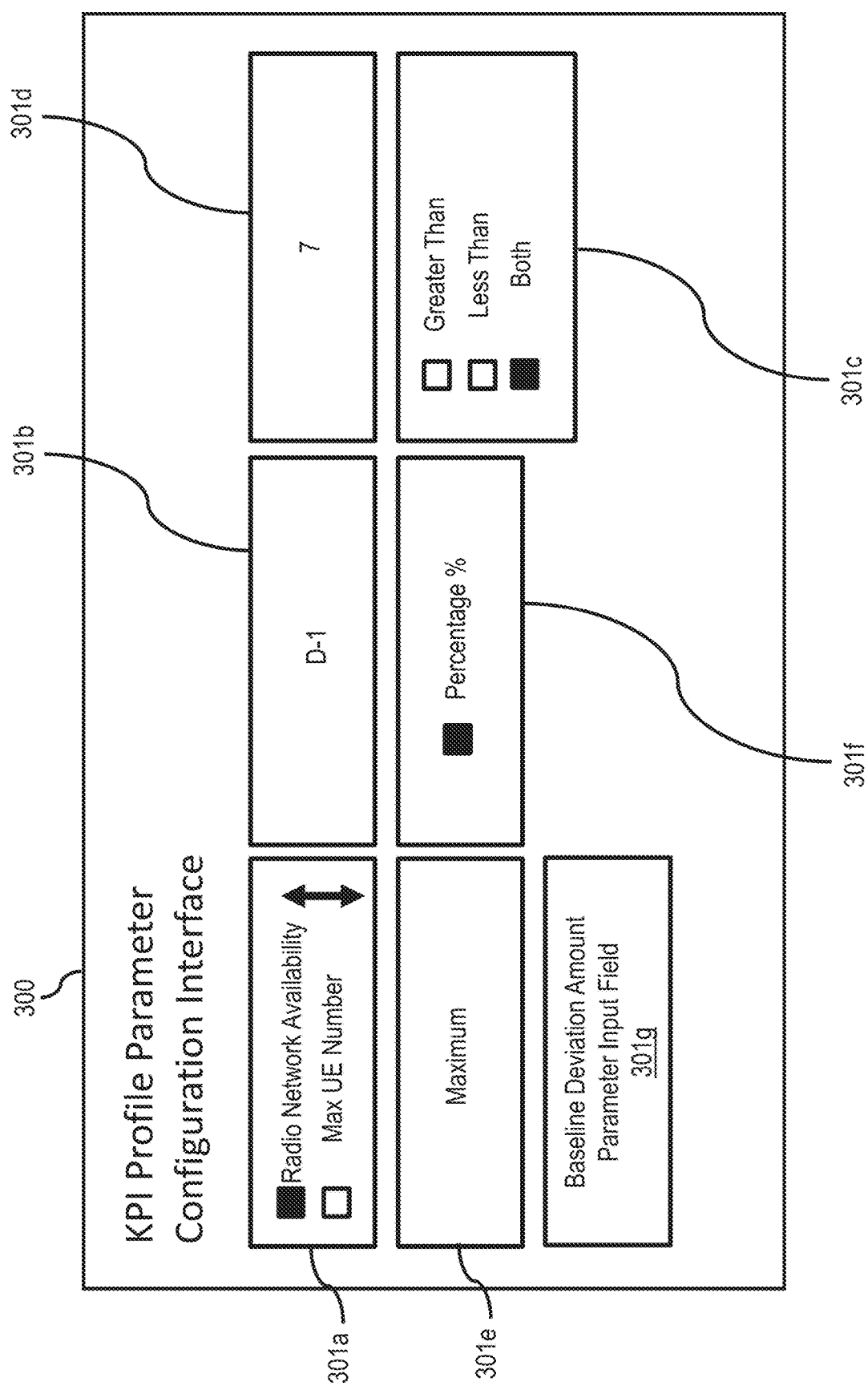
FIG. 12 is a diagram of a graphical user interface, in accordance with one or more embodiments.

FIG. 12 is a diagram of graphical user interface 300, in accordance with one or more embodiments.

In this example of graphical user interface 300, the user input field 301c includes a drop-down box of options for how the operating state of the network is to be determined based on a deviation manner with respect to the dynamic baseline threshold value. User input field 301c includes options "greater than", "less than", or "both. In some embodiments, other options are possible such as "greater than or equal to" and/or "less than or equal to", "equal to", or some other suitable option.

In some embodiments, similar to other user input fields 301, user input field 301c includes a keyword search field in which the user can manually input a keyword associated with the parameter of the type of baseline comparison to initiate a search for a baseline comparison type corresponding to the selected target KPI value and cause the network management platform 101 searches the database 103 for preset baseline comparison types corresponding to the selected target KPI value, or the user can select one or more of the options provided by user input field 301c.

Figure 13:
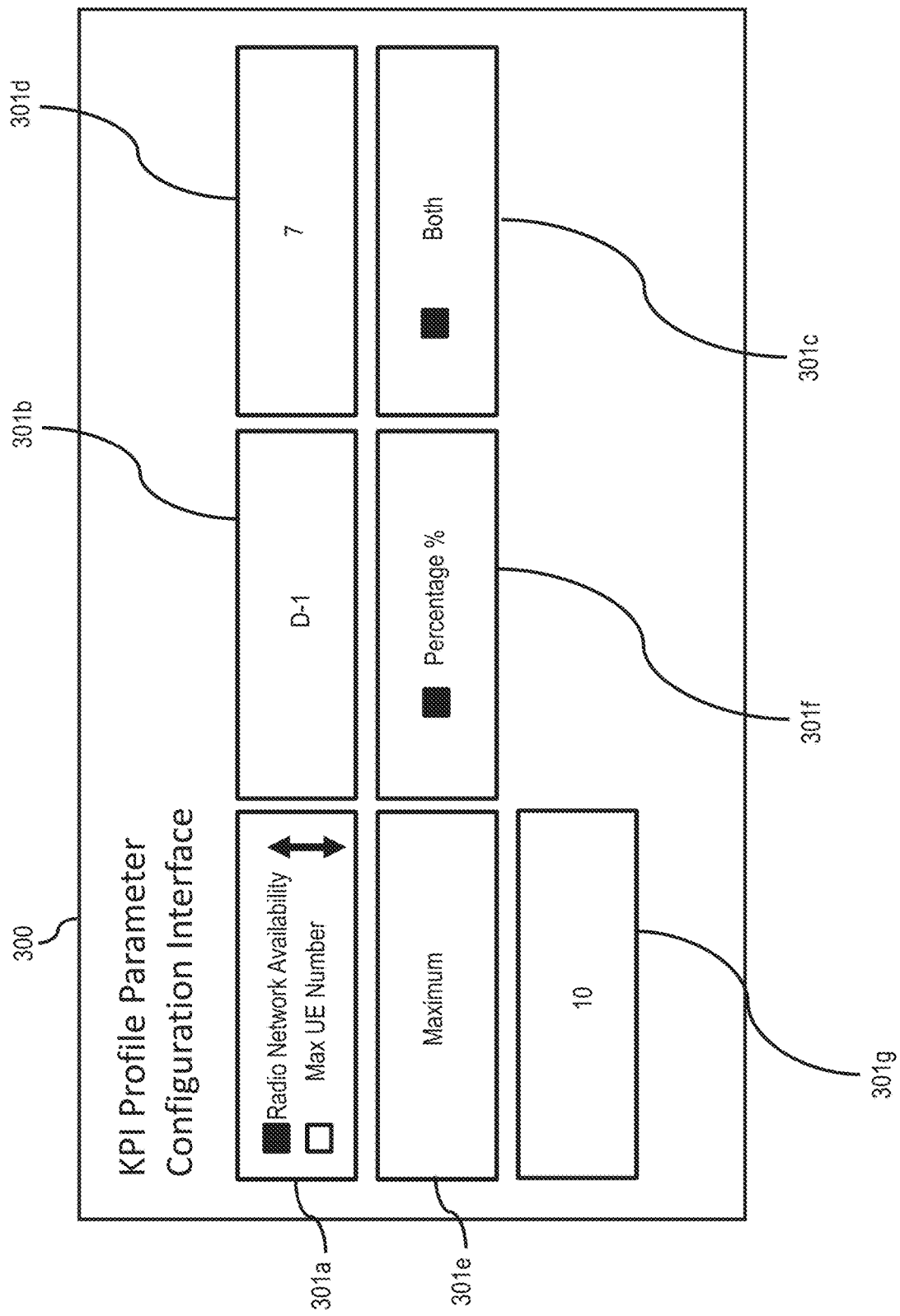
FIG. 13 is a diagram of a graphical user interface, in accordance with one or more embodiments.

FIG. 13 is a diagram of graphical user interface 300, in accordance with one or more embodiments.

In this example of graphical user interface 300, the user input field 301g includes a drop-down box of options corresponding to a threshold percentage. This is the parameter to which the network management platform 101 uses to determine the difference(s) between the current KPI data value and the dynamic baseline threshold value to determine the operating state of the network.

In some embodiments, similar to other user input fields 301, user input field 301g includes a keyword search field in which the user can manually input the parameter of the threshold percentage, an integer, a range, select a preset option corresponding to the selected target KPI value in a drop-down box comprising a list of available percentages, integers, ranges, etc., input a keyword that the network management platform 101 uses to search database 103 for corresponding deviation values, or some other suitable option.

Figure 14:
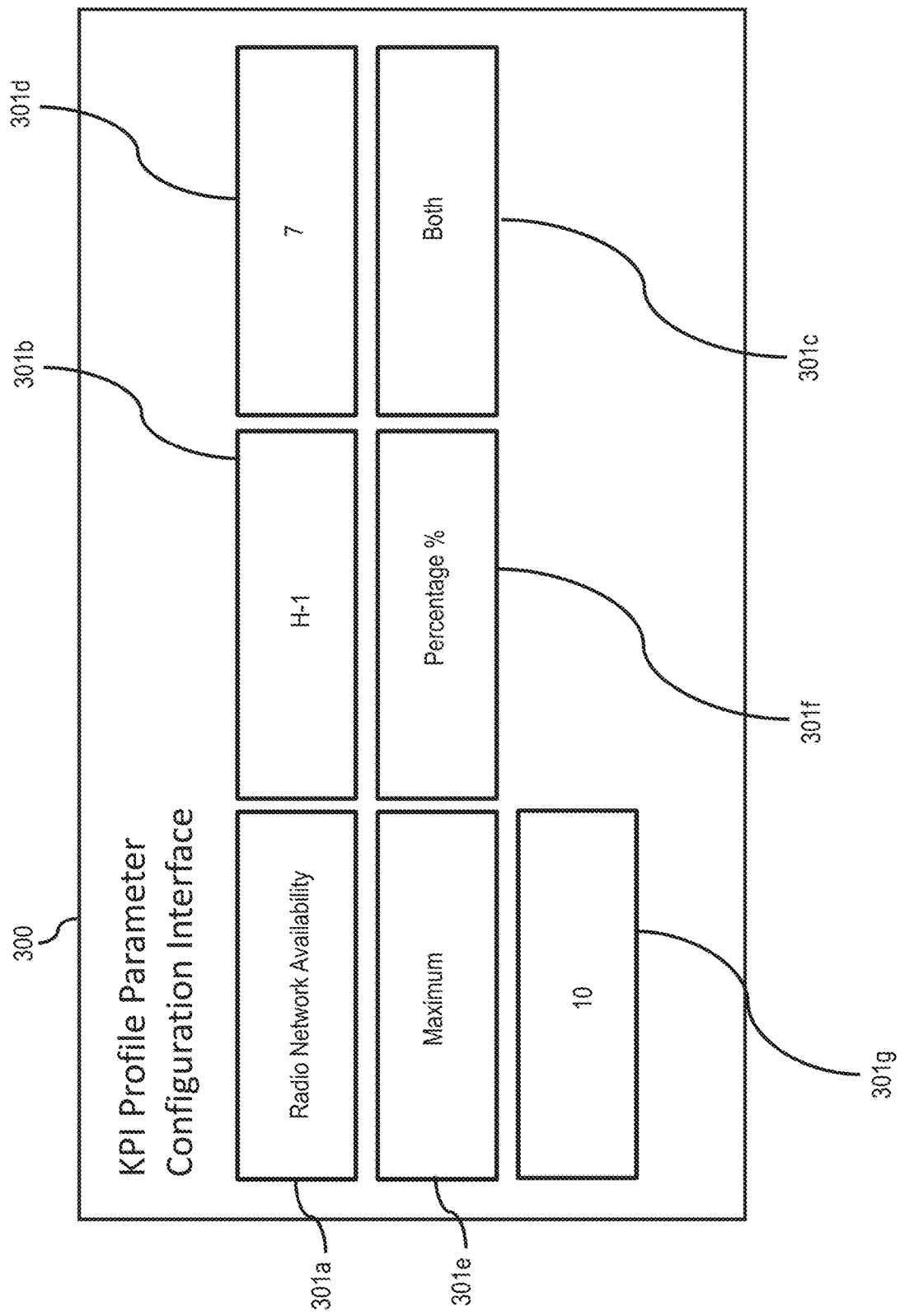
FIG. 14 is a diagram of a graphical user interface, in accordance with one or more embodiments.

FIG. 14 is a diagram of graphical user interface 300, in accordance with one or more embodiments.

In this example of graphical user interface 300, all of the user input fields 301a-301f are populated. Based on a received instruction to save the populated user input fields 301a-301f, the network management platform 101 causes the configuration and the entries in the user input fields 301a-301g to be saved in database 103 to generate a KPI management profile. In some embodiments, a "save" button is presented on the graphical user interface 300. In some embodiments, the save instruction is based on a simultaneous pressing Ctrl and S buttons on keyboard, by instructing the system via voice control, or by way of some other suitable operation.

In this example, the configurations of the KPI management profile are as follows:
Target KPI: Radio Network Availability
Time Reference: Current Hour (H)–1
Time Window: 7
Baseline Option: Max
Type of Baseline: Percentage (%)
Type of Baseline Comparison: Both (i.e., both minimum and maximum)
Threshold Percentage: 10(%)

In some embodiments, as the user is populating the user input fields 301a-301n, network management platform 101 optionally causes a preview interface to be displayed concurrently with graphical user interface 300 or in a separate graphical user interface.

The preview interface, for example, includes an explanation of the KPI management profile that is to be generated, including the one or more of the target KPI(s), the historical KPI parameter(s) (e.g., the time reference, frequency, etc.), the quantity of historical KPI values for each target KPI according to the historical KPI parameter, available or projected values for minimum, maximum and mean values for the historical KPI values, a textual explanation of what happens if a baseline comparison option of greater than, less than, both, or other suitable option is selected, the threshold percentage or integer comparisons, and what the threshold amount is which serves as the trigger for determining whether a baseline threshold is breached for identifying whether the network is operating in a normal or abnormal state.

In some embodiments, network management platform 101 causes the preview interface to demonstrate different scenarios based on different options or combinations of options available to be selected in graphical user interface 300. In some embodiments, network management platform 101 causes the preview interface to update the explanation of the KPI management profile in response to different options or combinations of options being selected and/or changed in graphical user interface 300 to facilitate educating the user on what rules are to be applied and what the outcome of such rules will be should the KPI management profile be generated in accordance with the inputs received by way of graphical user interface 300 for monitoring one or more target KPIs and ascertaining the operating state of the network.

For example, if the KPI management profile above is modified by way of graphical user interface 300 the time reference is changes from H-1 to D-1, network management platform 101 will cause values for 7 days of historical KPI values to be shown in preview interface, identify which of those values is the maximum value to be used as the baseline threshold value, and indicate the value that will cause the network management platform 101 to determine the network is in an abnormal state according to the 10% threshold percentage. Then, in response to changing the baseline option from Max to Min, network management platform 101 will cause values for 7 days of historical KPI values to be shown in preview interface, identify which of those values is the minimum value to be used as the baseline threshold value, and indicate the value that will cause the network management platform 101 to determine the network is in an abnormal state according to the 10% threshold percentage.

In some embodiments, the preview interface includes multiple combinations of possible parameters such as min, max and mean in a same screen to facilitate fast selection and creation of a KPI management profile.

Figure 15:
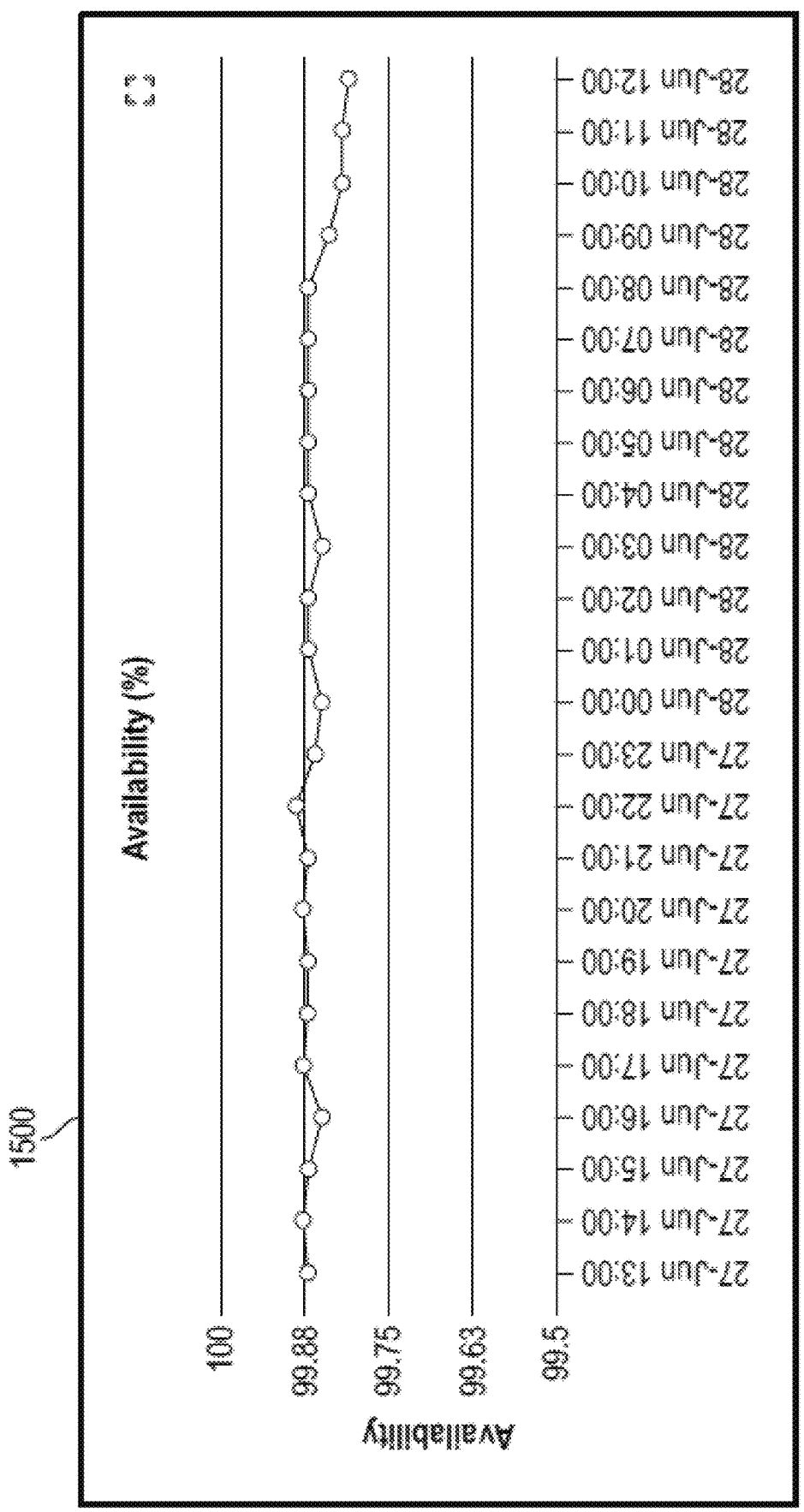
FIG. 15 is a diagram of a graphical user interface, in accordance with one or more embodiments.

FIG. 15 is a diagram of a graphical user interface 1500, in accordance with one or more embodiments.

Graphical user interface 1500 is a data plot of historical KPI values related to target KPI value, Radio Network Availability, indicated in the KPI management profile configured as discussed with respect to FIG. 14.

The data plot generated and shown in graphical user interface 1500 is based on the current time being 12:00 and, because the time reference is selected as "H-1" and the time window is selected as "7", the network management platform 101 retrieves historical KPI values for 11:00, 10:00, 9:00, 8:00, 7:00, 6:00, and 5:00 (7 historical KPI values, each of which correspond to the historical KPI data one hour before the proceeding KPI value).

In this example, since "maximum" is selected as the baseline option and "percentage" is selected as the type of baseline option, the network management platform 101 will determine which of the retrieved seven sets of historical KPI data has the highest value in percentage. In this example, since the KPI data for 5:00-8:00 (i.e., "99.88%") has the highest value in percentage among the seven retrieved KPI values, "99.88%" will be selected by network management platform 101 as the dynamic baseline threshold. If, for example, "mean" was selected as the baseline threshold option, network management platform 101 would calculate a mean of the retrieved seven sets of historical KPI values and the mean would be used as the dynamic baseline threshold value.

Further, since "both" is selected as the type of baseline comparison and "10%" is selected as the threshold percentage, the network management platform 101 compares the current KPI data with the baseline threshold of 99.88%, and determines whether or not the current KPI data value is 10% above 99.88% and/or is 10% below 99.88%.

In this case, since the current KPI data value is not 10% above or below 99.88%, the current KPI data does not satisfy the conditions defined by the KPI management profile. If, for example, the current KPI data is 10% above or below 99.88%, such condition may imply that the current KPI data satisfies the conditions defined by the KPI management profile, and thus the network management platform 101 would cause a selected or predefined action to be performed (e.g., alarming the user, performing load balancing, or other suitable action).

If, for example, an hour has passed (i.e., the current time is now 13:00) but the configuration of the KPI management profile remains unchanged, the KPI data of 12:00 will be considered as one of the historical KPI values, and a new dynamic baseline threshold value will be computed based on the KPI management profile, taking into consideration of the KPI data value of 12:00. For example, at this time, the network management platform 101 will retrieve historical KPI data of 12:00, 11:00, 10:00, 9:00, 8:00, 7:00, and 6:00, and will determine a new dynamic baseline threshold value based on the new set of historical KPI values.

Since the historical KPI values involved in the computation of the new dynamic baseline threshold value are different from the previous set of historical KPI values (i.e., KPI data value of 12:00 is included and KPI data value of 5:00 is excluded), the new dynamic baseline threshold value may also be different from the previous one. Such a condition reflects the dynamic characteristics of the dynamic baseline threshold value, since the baseline threshold value being used by the network management platform 101 will be continuously monitored and adjusted based on the KPI management profile and the latest historical KPI data.

Once a user configures a KPI management profile, the network management platform 101 can be set to continuously monitor one or more a target KPI(s) and automatically set or adjust a threshold(s) for the target KPI(s) based on the KPI management profile and the latest historical KPI data, without requiring continuous supervision by the user.

Figure 16:
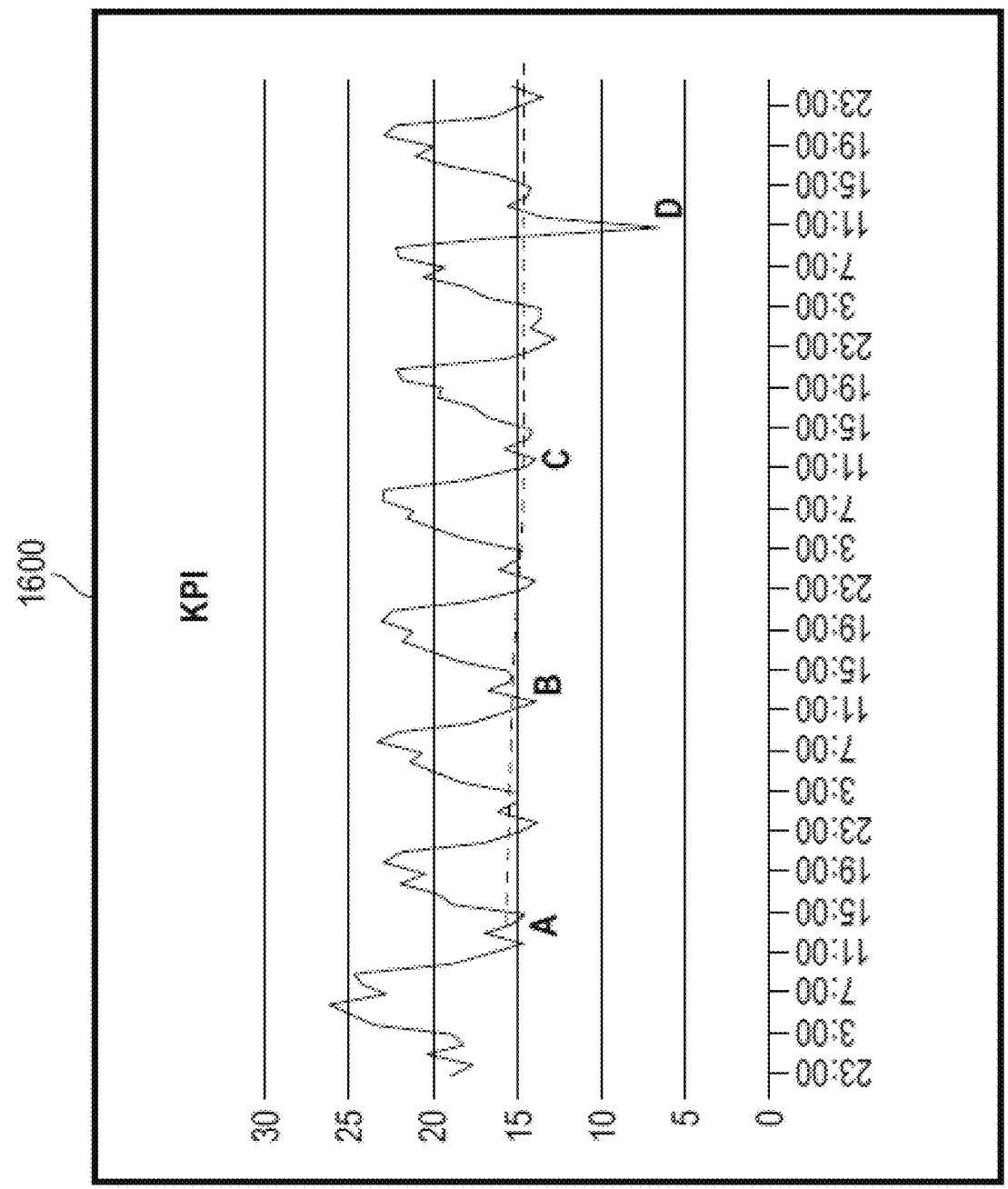
FIG. 16 is a diagram of a graphical user interface, in accordance with one or more embodiments.

FIG. 16 is a diagram of a graphical user interface 1600, in accordance with one or more embodiments.

In some embodiments, network management platform 101 causes graphical user interface 1600 to be output to the display. Graphical user interface 1600 comprises a data plot of the dynamic baseline threshold value over time so that a user is able to see a general trend of the dynamic baseline threshold value and determine if any adjustments to the communication system may be needed.

In some embodiments, a multiple sets of historical KPI values are included in the data plot to demonstrate how the historical KPI values correspond to the trend of the dynamic baseline threshold value over time. For example, the network management platform 101 causes first and second sets of historical KPI values to be generated, as discussed above, and then causes a third set of historical KPI values to be generated by adding a second KPI value received after a first KPI value to the second set of the one or more historical KPI values and deleting an oldest historical KPI value of the one or more KPI values included in the second set of historical KPI values based on the KPI historical data parameter. The network management platform 101 then causes the dynamic baseline threshold value to be updated based on the third set of the one or more historical values. Network management platform 101 causes the KPI management profile to be updated by replacing the dynamic baseline threshold value with the updated dynamic baseline threshold value, and causes the updated dynamic baseline threshold value to be added to the data plot included in graphical user interface 1600. Next, network management platform 101 causes the third set of historical KPI values to be added to the data plot to generate a graphical comparison of the one or more historical KPI values that include in the third set of historical KPI values with the updated dynamic baseline threshold over time.

In this example of user interface 1600, network management platform 101 has generated dynamic baseline threshold values (represented in FIG. 16 as dashed-line) and compare the current KPI value at points A, B, C and D to the respective dynamic baseline threshold value. At points A, B and C, the current KPI value is relatively close to the respective dynamic baseline threshold value, and at point D the current KPI value is significantly different from the respective dynamic baseline threshold value. If the difference between the current KPI value and the dynamic baseline threshold value satisfies the conditions defined by the KPI management profile, such a condition indicates an abnormal operating state of the network, or vice versa. Accordingly, network management platform 101 causes an alert to be sent to the user and/or some network function to be modified or activated to prevent changes to the dynamic baseline threshold value from occurring beyond the predefined amount for future process cycles.

In some embodiments, a variation in dynamic baseline threshold values can also be a cause for concern and indicative of an abnormal operating state of the network. For example, if the dynamic baseline threshold value at point D is significantly different from the dynamic baseline threshold values at points A, B, and C, such condition may indicate an abnormal operating state of the network around point D. Alternatively, in some embodiments, the system recognizes that the variations in dynamic baseline threshold values at different points (e.g., points A, B, C, and D) are normal and acceptable. For instance, a general trend away from other dynamic baseline threshold values at points A, B and C, the general trend of KPI values dipping at cyclical times such as those defined in the KPI management profile for generating a set of historical KPI values for generating the dynamic baseline threshold value occurring at times associated with KPI values at points A, B and C is determined to be normal and expected, and the trend itself is factored into the dynamic baseline threshold determination. As such, in an embodiment in which the network management platform 101 is configured to recognize trends of the dynamic baseline threshold value, regular occurrences of dips (or other variances) in KPI values are considered a normal operating state of the network. On the other hand, in the situation where a static baseline threshold value is utilized, a dip such as that demonstrated at point D, and/or all of points A, B, C and D might be considered abnormal because the variance from a conventional static threshold value of (e.g., 15) may be too far to be considered a normal operating state of the network, or a mere breach of a static threshold value at points A, B, C and D might cause an alert that the operating state of the communication state is abnormal when, in fact, the natural occurrence of dips in KPI values is normal. Namely, utilizing a conventional static threshold value may causes false alarming. By utilizing a dynamic baseline threshold as discussed above, the false alarming can be effectively reduced.

Figure 17:
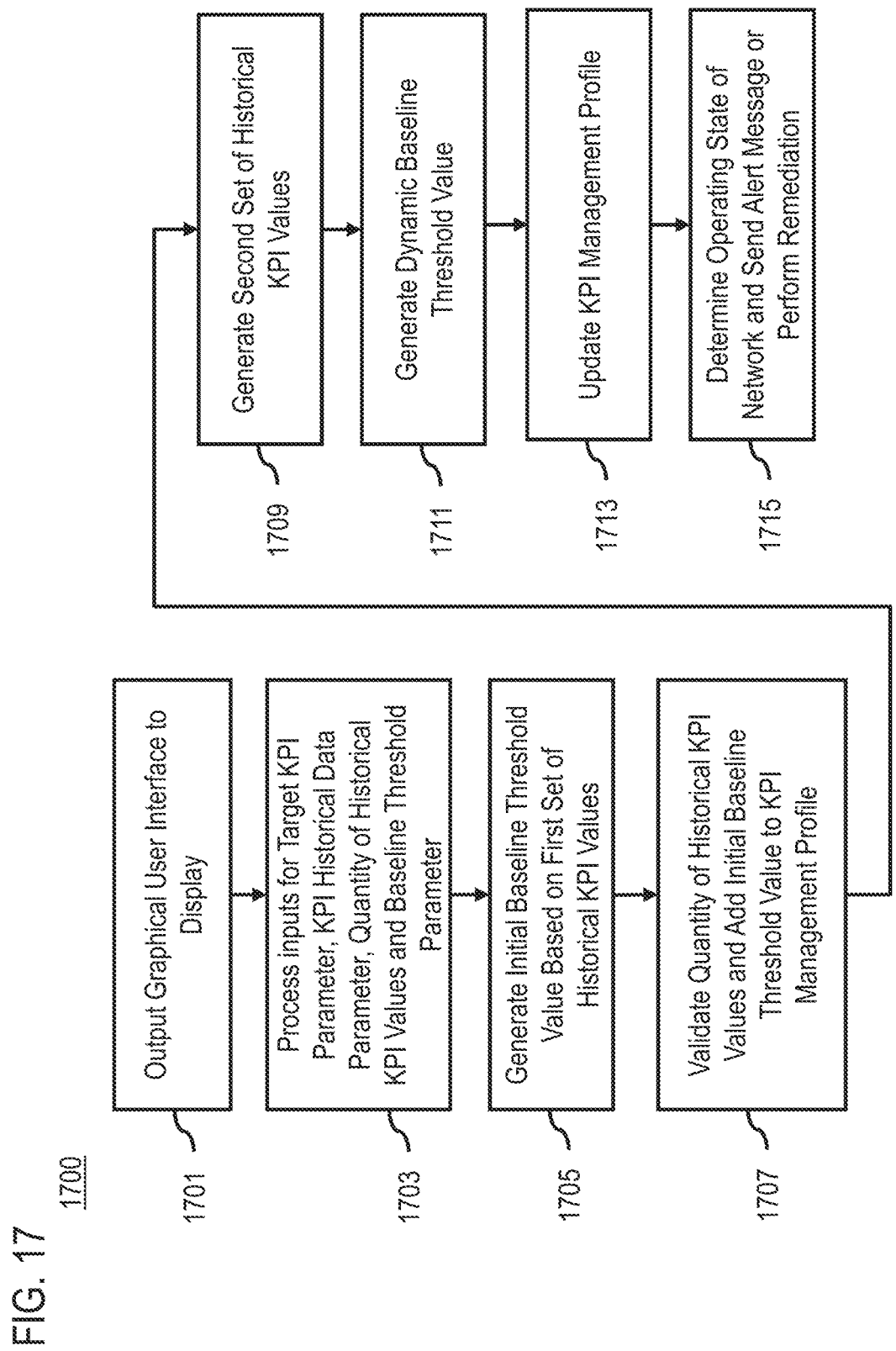
FIG. 17 is a flowchart of a process for network monitoring and generating one or more KPI management profiles, in accordance with one or more embodiments.

FIG. 17 is a flowchart of a process 1700 of facilitating network monitoring and/or generating one or more KPI management profiles, in accordance with one or more embodiments. In some embodiments, the network management platform 101 (FIG. 1) performs the process 1700.

In step 1701, a graphical user interface is caused to be output by a display. The graphical user interface comprises a first user input field configured to receive a first user input identifying a target KPI parameter associated with a network. The graphical user interface also comprises a second user input field configured to receive a second user input identifying a KPI historical data parameter. The graphical user interface additionally comprises one or more other user input fields configured to receive a user input identifying a baseline threshold parameter and/or a user interface field configured to receive a quantity of historical KPI values to be included in a first set of KPI values. In some embodiments, the quantity of historical KPI values serves as a time window that correlates to the units of time indicated by the KPI historical data parameter.

In step 1703, the target KPI, the KPI historical data parameter, the baseline threshold parameter and/or the quantity of historical KPI values are processed to generate a KPI management profile. In some embodiments, one or more additional KPI management parameters are added to the KPI management profile.

In step 1705, the quantity of historical KPI values to be included in the set of KPI values is validated and, in response to the quantity of historical KPI values to be included in the set of historical KPI values being available, the target KPI parameter and the first set of one or more historical KPI values are processed based on the KPI management profile to generate an initial baseline threshold value to which received KPI data is compared with respect to the conditions defined in the KPI management profile to determine an operating state of the network.

In step 1707, the initial baseline threshold value is caused to be added to the KPI management profile. In some embodiment, the initial baseline threshold value is caused to be temporarily added to the KPI management profile and will be discarded after a specific period of time.

In step 1709, a second set of historical KPI values are generated by adding a new KPI value to the first set of the one or more historical KPI values and deleting an oldest historical KPI value of the one or more KPI values included in the first set of historical KPI values based on the KPI management profile.

In step 1711, a dynamic baseline threshold value is caused to be generated based on the second set of the one or more historical values.

In step 1713, is the KPI management profile is caused to be updated by replacing the initial baseline threshold value with the dynamic baseline threshold value. In some embodiments, the initial baseline threshold value is a first dynamic baseline threshold value, and the dynamic baseline threshold value generated based on the second set of the one or more historical values is a second dynamic baseline threshold value.

In step 1715, received KPI data is processed to determine the operating state of the network based on the KPI management parameters set in the KPI management profile to cause one or more of an alert message to be sent to a user based on the operating state of the network being in an abnormal state, a message to be sent to the user indicating the operating state of the network regardless of whether the operating state of the network is normal or abnormal, and/or a remediation action to be preformed based on the operating state of the network being in an abnormal state.

The embodiments discussed herein provide a system and method which allow a user to customize the characteristics of baseline thresholds of target KPI(s) and automatically monitor the target KPI(s) and adjust the baseline threshold of the target KPI(s) in a manner that corresponds to a user's preference. The discussed embodiments allow a user to customize a dynamic baseline threshold for multiple target KPIs at once, or to customize a dynamic baseline threshold value of one KPI in multiple manners. In some embodiments, the discussed system and method allow multiple users to customize dynamic baseline threshold value(s) of a same target KPI in different manners corresponding to each user, thereby creating a dynamic threshold for one or more target KPIs based on each user's preferred configuration. The discussed system and method significantly reduce the burden of one or more users in monitoring multiple KPIs. In some embodiments, the discussed system and method provide system flexibility for multiple users, and reduce the rate of a user receiving unintended alarming caused by unintended threshold setup by other users. In some embodiments, the discussed system and method provides the capability for network monitoring to be based on dynamic baseline threshold values that are up-to-date with respect to the target KPI. In practice, having an up-to-date dynamic baseline threshold value in a network monitoring system can effectively reduce the rate of one or more users receiving false alarms caused by static baseline thresholds or outdated baseline threshold configurations while reducing instances and/or amounts of time the network is in an abnormal operating state.

Figure 18:
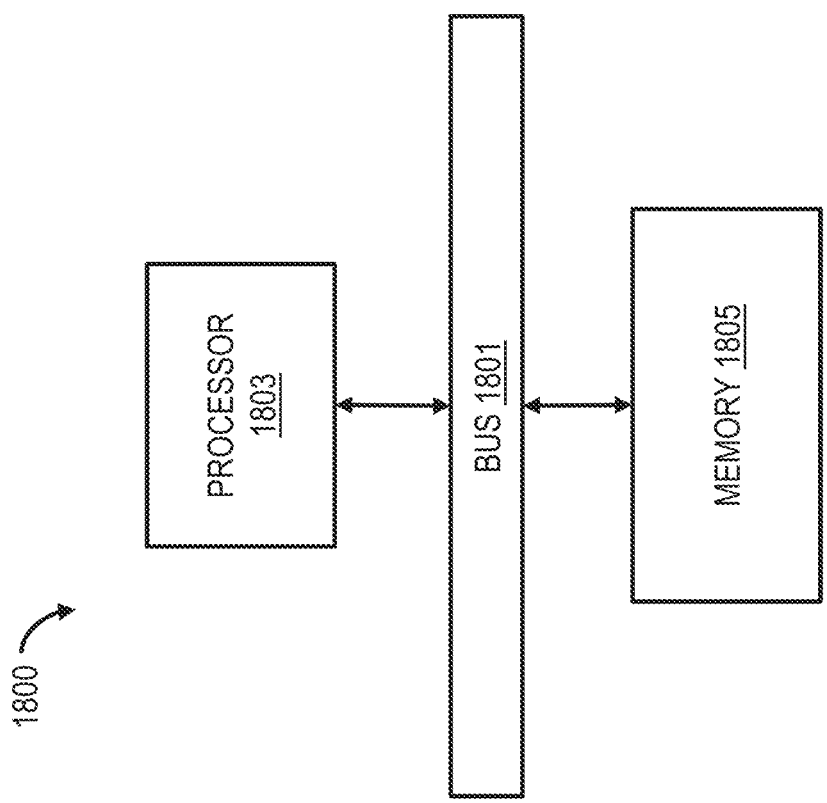
FIG. 18 is a functional block diagram of a computer or processor-based system upon which or by which some embodiments are implemented.

FIG. 18 is a functional block diagram of a computer or processor-based system 1800 upon which or by which an embodiment is implemented.

Processor-based system 1800 is programmed to facilitate network monitoring and/or generating one or more KPI management profiles, as described herein, and includes, for example, bus 1801, processor 1803, and memory 1805 components.

In some embodiments, the processor-based system is implemented as a single "system on a chip." Processor-based system 1800, or a portion thereof, constitutes a mechanism for performing one or more steps of facilitating network monitoring and/or generating one or more KPI management profiles.

In some embodiments, the processor-based system 1800 includes a communication mechanism such as bus 1801 for transferring and/or receiving information and/or instructions among the components of the processor-based system 1800. Processor 1803 is connected to the bus 1801 to obtain instructions for execution and process information stored in, for example, the memory 1805. In some embodiments, the processor 1803 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 1803. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 1803 performs a set of operations on information as specified by a set of instructions stored in memory 1805 related to facilitating network monitoring and/or generating one or more KPI management profiles. The execution of the instructions causes the processor to perform specified functions.

The processor 1803 and accompanying components are connected to the memory 1805 via the bus 1801. The memory 1805 includes one or more of dynamic memory (e.g., RAM, magnetic disk, writable optical disk, etc.) and static memory (e.g., ROM, CD-ROM, etc.) for storing executable instructions that when executed perform the steps described herein to facilitate network monitoring and/or generating one or more KPI management profiles. The memory 1805 also stores the data associated with or generated by the execution of the steps.

In one or more embodiments, the memory 1805, such as a random-access memory (RAM) or any other dynamic storage device, stores information including processor instructions for facilitating network monitoring and/or generating one or more KPI management profiles. Dynamic memory allows information stored therein to be changed. RAM allows a unit of information stored at a location called a memory address to be stored and retrieved independently of information at neighboring addresses. The memory 1805 is also used by the processor 1803 to store temporary values during execution of processor instructions. In various embodiments, the memory 1805 is a read only memory (ROM) or any other static storage device coupled to the bus 1801 for storing static information, including instructions, that is not capable of being changed by processor 1803. Some memory is composed of volatile storage that loses the information stored thereon when power is lost. In some embodiments, the memory 1805 is a non-volatile (persistent) storage device, such as a magnetic disk, optical disk or flash card, for storing information, including instructions, that persists even when the system 1800 is turned off or otherwise loses power.

The term "computer-readable medium" as used herein refers to any medium that participates in providing information to processor 1803, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is directed to an apparatus comprising a processor and a memory having instructions stored thereon that, when executed by the processor, cause the apparatus to cause a graphical user interface to be output by a display. The graphical user interface comprises a first user input field configured to receive a first user input identifying a target key performance indicator (KPI) parameter associated with a network. The graphical user interface also comprises a second user input field configured to receive a second user input identifying a KPI historical data parameter. The graphical user interface further comprises a third user input field configured to receive a third user input identifying a baseline threshold parameter. The graphical user interface additionally comprises a fourth user input field configured to receive a fourth user input identifying a quantity of historical KPI values to be included in a first set of one or more historical KPI values. The apparatus is also caused to process the target KPI parameter, the KPI historical data parameter, the quantity of historical KPI values, and the baseline threshold parameter to generate a KPI management profile. In response to validating the quantity of historical KPI values is available to be included in the first set of one or more historical KPI values, the apparatus is further caused to process the target KPI parameter and the first set of one or more historical KPI values based on the KPI historical data parameter to generate an initial baseline threshold value to which target KPI data is compared with respect to the KPI management profile to determine an operating state of the network.

In some embodiments, the apparatus is further caused to: cause the initial baseline threshold value to be added to the KPI management profile; cause a second set of historical KPI values to be generated by adding a first KPI value to the first set of the one or more historical KPI values and deleting an oldest historical KPI value of the one or more KPI values included in the first set of historical KPI values based on the KPI historical data parameter; cause a dynamic baseline threshold value to be generated based on the second set of the one or more historical KPI values; and cause the KPI management profile to be updated by replacing the initial baseline threshold value with the dynamic baseline threshold value.

In some embodiments, the apparatus is further caused to: cause a third set of historical KPI values to be generated by adding a second KPI value received after the first KPI value to the second set of the one or more historical KPI values and deleting an oldest historical KPI value of the one or more KPI values included in the second set of historical KPI values based on the KPI historical data parameter; cause the dynamic baseline threshold value to be updated based on the third set of the one or more historical values; and cause the KPI management profile to be updated by replacing the dynamic baseline threshold value with the updated dynamic baseline threshold value.

In some embodiments, the graphical user interface further comprises a fifth user input field configured to receive a fifth user input identifying a first dynamic baseline threshold value adjustment option, the first dynamic baseline threshold value adjustment option being indicative of whether the quantity of the historical KPI values included in the second set of the one or more historical KPI values that are to be included in the calculation for generating the dynamic baseline threshold value are maximum values among the historical values included in the second set of the one or more historical KPI values, minimum values among the historical KPI values included in the second set of the one or more historical KPI values, or whether a mean of the quantity of the historical KPI values included in the second set of the one or more historical KPI values that are to be included in the calculation for generating the dynamic baseline threshold value is to be used for generating the dynamic baseline threshold value, and the apparatus is caused to process the target KPI parameter, the KPI historical data parameter, the quantity of historical KPI values, the baseline threshold parameter, and the first dynamic baseline threshold value adjustment option to generate the KPI management profile.

In some embodiments, the graphical user interface further comprises a sixth user input field configured to receive a sixth user input identifying a second dynamic baseline threshold value adjustment option, the second dynamic baseline threshold value adjustment option being indicative of a deviation tolerance from a most recent dynamic threshold adjustment value for identifying one or more outliers among the quantity of the historical KPI values that are available to be included in the calculation for generating the dynamic baseline threshold value and excluding the one or more outliers from the calculation for generating the dynamic baseline threshold value, and the apparatus is caused to process the target KPI parameter, the KPI historical data parameter, the quantity of historical KPI values, the baseline threshold parameter, the first dynamic baseline threshold value adjustment option, and the second dynamic baseline threshold value adjustment option, to generate the KPI management profile.

In some embodiments, the baseline threshold parameter designates a deviation manner from the dynamic baseline threshold value, the deviation manner being one of greater than the dynamic baseline threshold value, less than the dynamic baseline threshold value, or different from the dynamic baseline threshold value.

In some embodiments, the graphical user interface further comprises a fifth user input field configured to receive a fifth user input identifying a tolerance range from the dynamic baseline threshold value, the tolerance range being with respect to the dynamic baseline threshold and according to the deviation manner, and the apparatus is caused to process the target KPI parameter, the KPI historical data parameter, the quantity of historical KPI values, the baseline threshold parameter, and the tolerance range to generate the KPI management profile.

In some embodiments, the graphical user interface further comprises a sixth user input field configured to receive a sixth user input identifying a tolerance type corresponding to the tolerance range, the tolerance type being one of a percentage or an integer, and the apparatus is caused to process the target KPI parameter, the KPI historical data parameter, the quantity of historical KPI values, the baseline threshold parameter, the tolerance type, and the tolerance range to generate the KPI management profile.

In some embodiments, the apparatus is further caused to: process the first KPI value to determine the operating state of the network based on a comparison of the first KPI value and the initial baseline threshold value in accordance with the baseline threshold parameter; and in response to a determination that the operating state of the network is abnormal based on the KPI management profile, cause an alert message to be communicated to a user associated with the KPI management profile.

In some embodiments, the apparatus is further caused to: process the first KPI value to determine the operating state of the network based on a comparison of the first KPI value and the initial baseline threshold value in accordance with the baseline threshold parameter; and in response to a determination that the operating state of the network is abnormal based on the KPI management profile, initiate a remediation action to return the operating state of the network to a normal operating state.

In some embodiments, the first user input field is configured to receive multiple inputs identifying multiple target KPI parameters associated with a network, and the apparatus is caused to process the multiple target KPI parameters, the KPI historical data parameter, the quantity of historical KPI values, and the baseline threshold parameter to generate the KPI management profile.

In some embodiments, one of more of the second user input field, the third user input field, or the fourth user input field is configured to receive multiple inputs identifying KPI historical data parameters corresponding to the multiple target KPI parameters, multiple inputs identifying multiple quantities of historical KPI values, or multiple inputs identifying multiple baseline threshold parameters corresponding to the multiple target KPI parameters, and the apparatus is caused to process the multiple target KPI parameters, and the one or more of the multiple KPI historical data parameters, the multiple quantities of historical KPI values, or the multiple baseline threshold parameters to generate the KPI management profile.

Another aspect of this description is directed to a method comprising causing, by a processor, a graphical user interface to be output by a display. The graphical user interface comprises a first user input field configured to receive a first user input identifying a target key performance indicator (KPI) parameter associated with a network. The graphical user interface also comprises a second user input field configured to receive a second user input identifying a KPI historical data parameter. The graphical user interface further comprises a third user input field configured to receive a third user input identifying a baseline threshold parameter. The graphical user interface additionally comprises a fourth user input field configured to receive a fourth user input identifying a quantity of historical KPI values to be included in a first set of one or more historical KPI values. The method also comprises processing the target KPI parameter, the KPI historical data parameter, the quantity of historical KPI values, and the baseline threshold parameter to generate a KPI management profile. The method further comprises, in response to validating the quantity of historical KPI values is available to be included in the first set of one or more historical KPI values, processing the target KPI parameter and the first set of one or more historical KPI values based on the KPI historical data parameter to generate an initial baseline threshold value to which target KPI data is compared with respect to the KPI management profile to determine an operating state of the network.

In some embodiments, the method further comprises: causing the initial baseline threshold value to be added to the KPI management profile; causing a second set of historical KPI values to be generated by adding a first KPI value to the first set of the one or more historical KPI values and deleting an oldest historical KPI value of the one or more KPI values included in the first set of historical KPI values based on the KPI historical data parameter; causing a dynamic baseline threshold value to be generated based on the second set of the one or more historical KPI values; and causing the KPI management profile to be updated by replacing the initial baseline threshold value with the dynamic baseline threshold value.

In some embodiments, the method further comprises causing a third set of historical KPI values to be generated by adding a second KPI value received after the first KPI value to the second set of the one or more historical KPI values and deleting an oldest historical KPI value of the one or more KPI values included in the second set of historical KPI values based on the KPI historical data parameter; causing the dynamic baseline threshold value to be updated based on the third set of the one or more historical values; and causing the KPI management profile to be updated by replacing the dynamic baseline threshold value with the updated dynamic baseline threshold value.

In some embodiments, the graphical user interface further comprises a fifth user input field configured to receive a fifth user input identifying a first dynamic baseline threshold value adjustment option, the first dynamic baseline threshold value adjustment option being indicative of whether the quantity of the historical KPI values included in the second set of the one or more historical KPI values that are to be included in the calculation for generating the dynamic baseline threshold value are maximum values among the historical values included in the second set of the one or more historical KPI values, minimum values among the historical KPI values included in the second set of the one or more historical KPI values, or whether a mean of the quantity of the historical KPI values included in the second set of the one or more historical KPI values that are to be included in the calculation for generating the dynamic baseline threshold value is to be used for generating the dynamic baseline threshold value, and the method comprises processing the target KPI parameter, the KPI historical data parameter, the quantity of historical KPI values, the baseline threshold parameter, and the first dynamic baseline threshold value adjustment option to generate the KPI management profile.

In some embodiments, the graphical user interface further comprises a sixth user input field configured to receive a sixth user input identifying a second dynamic baseline threshold value adjustment option, the second dynamic baseline threshold value adjustment option being indicative of a deviation tolerance from a most recent dynamic threshold adjustment value for identifying one or more outliers among the quantity of the historical KPI values that are available to be included in the calculation for generating the dynamic baseline threshold value and excluding the one or more outliers from the calculation for generating the dynamic baseline threshold value, and the method comprises processing the target KPI parameter, the KPI historical data parameter, the quantity of historical KPI values, the baseline threshold parameter, the first dynamic baseline threshold value adjustment option, and the second dynamic baseline threshold value adjustment option, to generate the KPI management profile.

In some embodiments, the baseline threshold parameter designates a deviation manner from the dynamic baseline threshold value, the deviation manner being one of greater than the dynamic baseline threshold value, less than the dynamic baseline threshold value, or different from the dynamic baseline threshold value.

In some embodiments, the first user input field is configured to receive multiple inputs identifying multiple target KPI parameters associated with a network, one of more of the second user input field, the third user input field, or the fourth user input field is configured to receive multiple inputs identifying KPI historical data parameters corresponding to the multiple target KPI parameters, multiple inputs identifying multiple quantities of historical KPI values, or multiple inputs identifying multiple baseline threshold parameters corresponding to the multiple target KPI parameters, and the method comprises processing the multiple target KPI parameters, and the one or more of the multiple KPI historical data parameters, the multiple quantities of historical KPI values, or the multiple baseline threshold parameters to generate the KPI management profile.

Another aspect of this description is direct to a non-transitory computer readable medium having instructions stored that, when executed by a processor, cause an apparatus to cause a graphical user interface to be output by a display. The graphical user interface comprises a first user input field configured to receive a first user input identifying a target key performance indicator (KPI) parameter associated with a network. The graphical user interface also comprises a second user input field configured to receive a second user input identifying a KPI historical data parameter. The graphical user interface further comprises a third user input field configured to receive a third user input identifying a baseline threshold parameter. The graphical user interface additionally comprises a fourth user input field configured to receive a fourth user input identifying a quantity of historical KPI values to be included in a first set of one or more historical KPI values. The apparatus is also caused to process the target KPI parameter, the KPI historical data parameter, the quantity of historical KPI values, and the baseline threshold parameter to generate a KPI management profile. In response to validating the quantity of historical KPI values is available to be included in the first set of one or more historical KPI values, the apparatus is further caused to process the target KPI parameter and the first set of one or more historical KPI values based on the KPI historical data parameter to generate an initial baseline threshold value to which target KPI data is compared with respect to the KPI management profile to determine an operating state of the network.

The foregoing outlines features of several embodiments so that those skilled in the art may better understand the aspects of the present disclosure. The present disclosure includes features that make it possible to customize the characteristics of baseline thresholds of target KPI(s), automatically monitor the target KPI(s), adjust the baseline threshold of the target KPI(s), determine an operating state of the network, report the operating state of the network, alert an abnormal operating state of the network, and/or remediate an abnormal operating state of the network in a manner that corresponds to a user's preference. The discussed embodiments make it possible to generate a dynamic baseline threshold for multiple target KPIs at once, or a dynamic baseline threshold value of one KPI in multiple manners in accordance with one or more user(s) preferences. In some embodiments, the discussed system and method make it possible for multiple users to customize dynamic baseline threshold value(s) of a same target KPI in different manners corresponding to each user, thereby creating a dynamic threshold for one or more target KPIs based on each user's preferred configuration. The discussed embodiments significantly reduce the burden of one or more users in monitoring multiple KPIs while providing system flexibility for multiple users, reducing the rate of a user receiving unintended alarming caused by unintended threshold setup by other users, and reducing the burden on a user by determining the operating status of the network without the user doing the legwork. In some embodiments, the discussed system and method provides the capability for network monitoring to be based on dynamic baseline threshold values that are up-to-date with respect to the target KPI. Having up-to-date dynamic baseline threshold values in a network monitoring system can effectively reduce the rate of one or more users receiving false alarms caused by static baseline thresholds or outdated baseline threshold configurations while reducing instances and/or amounts of time the network is in an abnormal operating state.

Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus, comprising:
   a processor; and
   a memory having instructions stored thereon that, when executed by the processor, cause the apparatus to:
     cause a graphical user interface to be output by a display, the graphical user interface comprising:

a first user input field configured to receive a first user input identifying a target key performance indicator (KPI) parameter associated with a network;

a second user input field configured to receive a second user input identifying a KPI historical data parameter;

a third user input field configured to receive a third user input identifying a baseline threshold parameter; and a fourth user input field configured to receive a fourth user input identifying a quantity of historical KPI values to be included in a first set of one or more historical KPI values;

process the target KPI parameter, the KPI historical data parameter, the quantity of historical KPI values, and the baseline threshold parameter to generate a KPI management profile;

in response to validating that a quantity of available historical KPI values satisfies the quantity input as the fourth user input in the fourth user input field:

process the target KPI parameter and the first set of one or more historical KPI values based on the KPI historical data parameter to generate an initial baseline threshold value to which target KPI data is compared with respect to the KPI management profile to determine an operating state of the network; and in response to determining that the quantity of available historical KPI values is less than the quantity input as the fourth user input in the fourth user input field:

await a next process cycle for the quantity of historical KPI values to be achieved.

2. The apparatus of claim 1, wherein the apparatus is further caused to:

cause the initial baseline threshold value to be added to the KPI management profile;

cause a second set of historical KPI values to be generated by adding a first KPI value to the first set of the one or more historical KPI values and deleting an oldest historical KPI value of the one or more KPI values included in the first set of historical KPI values based on the KPI historical data parameter;

cause a dynamic baseline threshold value to be generated based on the second set of the one or more historical KPI values; and cause the KPI management profile to be updated by replacing the initial baseline threshold value with the dynamic baseline threshold value.

3. The apparatus of claim 2, wherein the apparatus is further caused to:

cause a third set of historical KPI values to be generated by adding a second KPI value received after the first KPI value to the second set of the one or more historical KPI values and deleting an oldest historical KPI value of the one or more KPI values included in the second set of historical KPI values based on the KPI historical data parameter;

cause the dynamic baseline threshold value to be updated based on the third set of the one or more historical values; and cause the KPI management profile to be updated by replacing the dynamic baseline threshold value with the updated dynamic baseline threshold value.

4. The apparatus of claim 2, wherein
the graphical user interface further comprises:
a fifth user input field configured to receive a fifth user input identifying a first dynamic baseline threshold value adjustment option, the first dynamic baseline threshold value adjustment option being indicative of whether the quantity of the historical KPI values included in the second set of the one or more historical KPI values that are to be included in the calculation for generating the dynamic baseline threshold value are maximum values among the historical values included in the second set of the one or more historical KPI values, minimum values among the historical KPI values included in the second set of the one or more historical KPI values, or whether a mean of the quantity of the historical KPI values included in the second set of the one or more historical KPI values that are to be included in the calculation for generating the dynamic baseline threshold value is to be used for generating the dynamic baseline threshold value, and
the apparatus is caused to:
process the target KPI parameter, the KPI historical data parameter, the quantity of historical KPI values, the baseline threshold parameter, and the first dynamic baseline threshold value adjustment option to generate the KPI management profile.

5. The apparatus of claim 4, wherein
the graphical user interface further comprises:
a sixth user input field configured to receive a sixth user input identifying a second dynamic baseline threshold value adjustment option, the second dynamic baseline threshold value adjustment option being indicative of a deviation tolerance from a most recent dynamic threshold adjustment value for identifying one or more outliers among the quantity of the historical KPI values that are available to be included in the calculation for generating the dynamic baseline threshold value and excluding the one or more outliers from the calculation for generating the dynamic baseline threshold value, and
the apparatus is caused to:
process the target KPI parameter, the KPI historical data parameter, the quantity of historical KPI values, the baseline threshold parameter, the first dynamic baseline threshold value adjustment option, and the second dynamic baseline threshold value adjustment option, to generate the KPI management profile.

6. The apparatus of claim 2, wherein the baseline threshold parameter designates a deviation manner from the dynamic baseline threshold value, the deviation manner being one of greater than the dynamic baseline threshold value, less than the dynamic baseline threshold value, or different from the dynamic baseline threshold value.

7. The apparatus of claim 6, wherein
the graphical user interface further comprises:
a fifth user input field configured to receive a fifth user input identifying a tolerance range from the dynamic baseline threshold value, the tolerance range being with respect to the dynamic baseline threshold and according to the deviation manner, and
the apparatus is caused to:
process the target KPI parameter, the KPI historical data parameter, the quantity of historical KPI values, the baseline threshold parameter, and the tolerance range to generate the KPI management profile.

8. The apparatus of claim 7, wherein
the graphical user interface further comprises:
a sixth user input field configured to receive a sixth user input identifying a tolerance type corresponding to the tolerance range, the tolerance type being one of a percentage or an integer, and the apparatus is caused to:
process the target KPI parameter, the KPI historical data parameter, the quantity of historical KPI values, the baseline threshold parameter, the tolerance type, and the tolerance range to generate the KPI management profile.

9. The apparatus of claim 2, wherein the apparatus is further caused to:
process the first KPI value to determine the operating state of the network based on a comparison of the first KPI value and the initial baseline threshold value in accordance with the baseline threshold parameter; and
in response to a determination that the operating state of the network is abnormal based on the KPI management profile, cause an alert message to be communicated to a user associated with the KPI management profile.

10. The apparatus of claim 2, wherein the apparatus is further caused to:
process the first KPI value to determine the operating state of the network based on a comparison of the first KPI value and the initial baseline threshold value in accordance with the baseline threshold parameter; and
in response to a determination that the operating state of the network is abnormal based on the KPI management profile, initiate a remediation action to return the operating state of the network to a normal operating state.

11. The apparatus of claim 1, wherein
the first user input field is configured to receive multiple inputs identifying multiple target KPI parameters associated with a network, and
the apparatus is caused to:
process the multiple target KPI parameters, the KPI historical data parameter, the quantity of historical KPI values, and the baseline threshold parameter to generate the KPI management profile.

12. The apparatus of claim 11, wherein
one of more of the second user input field, the third user input field, or the fourth user input field is configured to receive multiple inputs identifying KPI historical data parameters corresponding to the multiple target KPI parameters, multiple inputs identifying multiple quantities of historical KPI values, or multiple inputs identifying multiple baseline threshold parameters corresponding to the multiple target KPI parameters, and
the apparatus is caused to:
process the multiple target KPI parameters, and the one or more of the multiple KPI historical data parameters, the multiple quantities of historical KPI values, or the multiple baseline threshold parameters to generate the KPI management profile.

13. A method, comprising:
causing, by a processor, a graphical user interface to be output by a display, the graphical user interface comprising:
a first user input field configured to receive a first user input identifying a target key performance indicator (KPI) parameter associated with a network;
a second user input field configured to receive a second user input identifying a KPI historical data parameter;
a third user input field configured to receive a third user input identifying a baseline threshold parameter; and
a fourth user input field configured to receive a fourth user input identifying a quantity of historical KPI values to be included in a first set of one or more historical KPI values;

processing the target KPI parameter, the KPI historical data parameter, the quantity of historical KPI values, and the baseline threshold parameter to generate a KPI management profile;
in response to validating that a quantity of available historical KPI values satisfies the quantity input as the fourth user input in the fourth user input field:
processing the target KPI parameter and the first set of one or more historical KPI values based on the KPI historical data parameter to generate an initial baseline threshold value to which target KPI data is compared with respect to the KPI management profile to determine an operating state of the network; and
in response to determining that the quantity of available historical KPI values is less than the quantity input as the fourth user input in the fourth user input field:
awaiting a next process cycle for the quantity of historical KPI values to be achieved.

14. The method of claim 13, further comprising:
causing the initial baseline threshold value to be added to the KPI management profile;
causing a second set of historical KPI values to be generated by adding a first KPI value to the first set of the one or more historical KPI values and deleting an oldest historical KPI value of the one or more KPI values included in the first set of historical KPI values based on the KPI historical data parameter;
causing a dynamic baseline threshold value to be generated based on the second set of the one or more historical KPI values; and
causing the KPI management profile to be updated by replacing the initial baseline threshold value with the dynamic baseline threshold value.

15. The method of claim 14, further comprising:
causing a third set of historical KPI values to be generated by adding a second KPI value received after the first KPI value to the second set of the one or more historical KPI values and deleting an oldest historical KPI value of the one or more KPI values included in the second set of historical KPI values based on the KPI historical data parameter;
causing the dynamic baseline threshold value to be updated based on the third set of the one or more historical values; and
causing the KPI management profile to be updated by replacing the dynamic baseline threshold value with the updated dynamic baseline threshold value.

16. The method of claim 14, wherein
the graphical user interface further comprises:
a fifth user input field configured to receive a fifth user input identifying a first dynamic baseline threshold value adjustment option, the first dynamic baseline threshold value adjustment option being indicative of whether the quantity of the historical KPI values included in the second set of the one or more historical KPI values that are to be included in the calculation for generating the dynamic baseline threshold value are maximum values among the historical values included in the second set of the one or more historical KPI values, minimum values among the historical KPI values included in the second set of the one or more historical KPI values, or whether a mean of the quantity of the historical KPI values included in the second set of the one or more historical KPI values that are to be included in the calculation for generating the dynamic baseline threshold value is to be used for generating the dynamic baseline threshold value, and the method comprises:

processing the target KPI parameter, the KPI historical data parameter, the quantity of historical KPI values, the baseline threshold parameter, and the first dynamic baseline threshold value adjustment option to generate the KPI management profile.

17. The method of claim 16, wherein the graphical user interface further comprises:

a sixth user input field configured to receive a sixth user input identifying a second dynamic baseline threshold value adjustment option, the second dynamic baseline threshold value adjustment option being indicative of a deviation tolerance from a most recent dynamic threshold adjustment value for identifying one or more outliers among the quantity of the historical KPI values that are available to be included in the calculation for generating the dynamic baseline threshold value and excluding the one or more outliers from the calculation for generating the dynamic baseline threshold value, and the method comprises:

processing the target KPI parameter, the KPI historical data parameter, the quantity of historical KPI values, the baseline threshold parameter, the first dynamic baseline threshold value adjustment option, and the second dynamic baseline threshold value adjustment option, to generate the KPI management profile.

18. The method of claim 14, wherein the baseline threshold parameter designates a deviation manner from the dynamic baseline threshold value, the deviation manner being one of greater than the dynamic baseline threshold value, less than the dynamic baseline threshold value, or different from the dynamic baseline threshold value.

19. The method of claim 13, wherein the first user input field is configured to receive multiple inputs identifying multiple target KPI parameters associated with a network, one of more of the second user input field, the third user input field, or the fourth user input field is configured to receive multiple inputs identifying KPI historical data parameters corresponding to the multiple target KPI parameters, multiple inputs identifying multiple quantities of historical KPI values, or multiple inputs identifying multiple baseline threshold parameters corresponding to the multiple target KPI parameters, and the method comprises:

processing the multiple target KPI parameters, and the one or more of the multiple KPI historical data parameters, the multiple quantities of historical KPI values, or the multiple baseline threshold parameters to generate the KPI management profile.

20. A non-transitory computer readable medium having instructions stored thereon that, when executed by a processor, cause an apparatus to:

cause a graphical user interface to be output by a display, the graphical user interface comprising:

a first user input field configured to receive a first user input identifying a target key performance indicator (KPI) parameter associated with a network;

a second user input field configured to receive a second user input identifying a KPI historical data parameter;

a third user input field configured to receive a third user input identifying a baseline threshold parameter; and a fourth user input field configured to receive a fourth user input identifying a quantity of historical KPI values to be included in a first set of one or more historical KPI values;

process the target KPI parameter, the KPI historical data parameter, the quantity of historical KPI values, and the baseline threshold parameter to generate a KPI management profile; and in response to validating that a quantity of available historical KPI values satisfies the quantity input as the fourth user input in the fourth user input field:

process the target KPI parameter and the first set of one or more historical KPI values based on the KPI historical data parameter to generate an initial baseline threshold value to which target KPI data is compared with respect to the KPI management profile to determine an operating state of the network; and in response to determining that the quantity of available historical KPI values is less than the quantity input as the fourth user input in the fourth user input field:

await a next process cycle for the quantity of historical KPI values to be achieved.

\* \* \* \* \*